US 10,491,752 B2
United States Patent
Lu et al.

(10) Patent No.: US 10,491,752 B2
(45) Date of Patent: Nov. 26, 2019

(54) SERVICE DOMAIN CHARGING SYSTEMS AND METHODS

(71) Applicant: Convida Wireless, LLC, Wilmington, DE (US)

(72) Inventors: Guang Lu, Thornhill (CA); Michael F. Starsinic, Newtown, PA (US); Paul L. Russell, Jr., Pennington, NJ (US); Dale N. Seed, Allentown, PA (US); Catalina M. Mladin, Hatboro, PA (US); Lijun Dong, San Diego, CA (US); William Robert Flynn, IV, Schwenksville, PA (US)

(73) Assignee: Convida Wireless, LLC, Wilmington, DE (US)

( * ) Notice: Subject to any disclaimer, the term of this patent is extended or adjusted under 35 U.S.C. 154(b) by 35 days.

(21) Appl. No.: 14/339,899

(22) Filed: Jul. 24, 2014

(65) Prior Publication Data

US 2015/0029894 A1     Jan. 29, 2015

Related U.S. Application Data

(60) Provisional application No. 61/886,458, filed on Oct. 3, 2013, provisional application No. 61/857,912, filed on Jul. 24, 2013.

(51) Int. Cl.
*H04L 12/14*     (2006.01)
*H04M 15/00*     (2006.01)
(Continued)

(52) U.S. Cl.
CPC ........ *H04M 15/61* (2013.01); *H04L 12/1407* (2013.01); *H04L 12/1453* (2013.01);
(Continued)

(58) Field of Classification Search
None
See application file for complete search history.

(56) References Cited

U.S. PATENT DOCUMENTS

| 5,943,657 A | 8/1999 | Freestone et al. |
| 8,730,823 B2 | 5/2014 | Mohamed et al. |

(Continued)

FOREIGN PATENT DOCUMENTS

| EP | 2 512 106 | 10/2012 |
| JP | 2014-529383 | 11/2014 |

(Continued)

OTHER PUBLICATIONS

3rd Generation Partnership Project; (3GPP) TR 23.682 V11.4.0; 3rd Generation Partnership Project; Technical Specification Group Services and System Aspects; Architecture Enhancements to Facilitate Communications with Packet Data Networks and Applications (Release 11), Jun. 2013, 29 pages.

(Continued)

*Primary Examiner* — Kodzovi Acolatse
(74) *Attorney, Agent, or Firm* — BakerHostetler

(57) ABSTRACT

Various mechanisms are disclosed for a service domain charging system that can interact with underlying networks. A service domain charging architecture is defined with several logical functions. Service-based charging types may be and applied to existing event, session, online, and offline charging mechanisms. Service domain charging messages may be exchanged over the X, Y, Z reference points. An E reference point may be used for interfacing with a service domain billing system, and a B reference point may be used between a service domain billing system and underlying network's billing system.

18 Claims, 28 Drawing Sheets

(51) Int. Cl.
H04L 29/08 (2006.01)
H04W 4/70 (2018.01)

(52) U.S. Cl.
CPC ............ H04L 67/12 (2013.01); H04M 15/41 (2013.01); H04M 15/43 (2013.01); H04M 15/64 (2013.01); H04M 15/65 (2013.01); H04W 4/70 (2018.02)

(56) References Cited

U.S. PATENT DOCUMENTS

| | | | |
|---|---|---|---|
| 9,300,531 | B2 | 3/2016 | D'Souza et al. |
| 9,425,969 | B2 | 8/2016 | Baer et al. |
| 2010/0039941 | A1* | 2/2010 | Tan .................. H04L 12/14 370/241 |
| 2011/0167471 | A1* | 7/2011 | Riley .................. H04W 4/00 726/1 |
| 2011/0225306 | A1* | 9/2011 | Delsesto ........... H04L 29/12896 709/227 |
| 2011/0295935 | A1 | 12/2011 | Vihtari et al. |
| 2012/0036257 | A1* | 2/2012 | Mann .................. H04L 65/1066 709/224 |
| 2012/0109800 | A1* | 5/2012 | Zhou .................. G06Q 30/04 705/34 |
| 2012/0149325 | A1 | 6/2012 | Titus et al. |
| 2012/0220330 | A1* | 8/2012 | Goldner .............. H04L 12/1407 455/517 |
| 2012/0246325 | A1* | 9/2012 | Pancorbo Marcos ....................... H04L 12/2602 709/227 |
| 2012/0284777 | A1* | 11/2012 | Eugenio .................. H04L 67/20 726/4 |
| 2013/0054428 | A1 | 2/2013 | Shaikh |
| 2013/0174212 | A1* | 7/2013 | Lalseta .................. H04L 63/10 726/1 |
| 2013/0176907 | A1* | 7/2013 | Foti .................. H04M 15/41 370/259 |
| 2013/0179583 | A1* | 7/2013 | Foti .................. H04L 65/1016 709/228 |
| 2013/0188554 | A1 | 7/2013 | Cai et al. |
| 2013/0203394 | A1* | 8/2013 | Dong .................. H04W 4/70 455/414.1 |
| 2013/0208629 | A1 | 8/2013 | Luo et al. |
| 2013/0288668 | A1 | 10/2013 | Pragada et al. |
| 2013/0297744 | A1* | 11/2013 | Foti .................. H04L 63/0281 709/219 |
| 2013/0324078 | A1 | 12/2013 | Xue et al. |
| 2013/0343231 | A1* | 12/2013 | Foti .................. H04L 12/1407 370/259 |
| 2014/0051384 | A1 | 2/2014 | Mao et al. |
| 2014/0056182 | A1 | 2/2014 | Chai |
| 2014/0189001 | A1* | 7/2014 | Tyagi .................. H04L 67/2809 709/204 |
| 2014/0273932 | A1* | 9/2014 | Sharma ................ H04M 15/65 455/406 |
| 2014/0273933 | A1 | 9/2014 | Sharma et al. |
| 2014/0289803 | A1 | 9/2014 | Sharma et al. |
| 2014/0295790 | A1* | 10/2014 | Vos .................. H04M 15/60 455/406 |
| 2014/0372287 | A1 | 12/2014 | Tornkvist |
| 2015/0011182 | A1 | 1/2015 | Goldner et al. |
| 2015/0023219 | A1* | 1/2015 | Jin .................. H04L 12/1403 370/259 |
| 2015/0195671 | A1* | 7/2015 | Seed .................. H04L 67/16 455/434 |
| 2015/0229779 | A1 | 8/2015 | Goermer et al. |
| 2015/0245205 | A1* | 8/2015 | Kim .................. H04W 72/10 726/4 |
| 2015/0333991 | A1 | 11/2015 | Liu et al. |
| 2015/0341851 | A1* | 11/2015 | Cai .................. H04W 4/08 455/434 |
| 2016/0212567 | A1 | 7/2016 | Iwai |

FOREIGN PATENT DOCUMENTS

| | | |
|---|---|---|
| WO | 2011/019773 A1 | 2/2011 |
| WO | WO 2012-177665 | 12/2012 |
| WO | WO 2015/013485 | 1/2015 |

OTHER PUBLICATIONS

3$^{rd}$ Generation Partnership Project; (3GPP) TR 23.888 V11.0.0; 3rd Generation Partnership Project; Technical Specification Group Services and System Aspects; System Improvements for Machine-Type Communications (MTC) (Release 11), Sep. 2012, 165 pages.
3rd Generation Partnership Project; (3GPP) TS 23.203, V12.0.0; 3rd Generation Partnership Project; Technical Specification Group Services and System Aspects; Policy and Charging Control Architecture, (Release 12), Mar. 2013, 183 pages.
3rd Generation Partnership Project; (3GPP) TS 23.682, V11.3.0; 3rd Generation Partnership Project; Technical Specification Group Services and System Aspects; Architecture Enhancements to Facilitate Communications With Packet Data Networks and Applications, (Release 11), Dec. 2012, 29 pages.
3rd Generation Partnership Project; (3GPP) TS 29.368 ,V11.2.0; 3rd Generation Partnership Project; Technical Specification Group Core Network and Terminals; Tsp interface protocol between the MTC Interworking Function (MTC-IWF) and Service Capability Server (SCS), (Release 11), Mar. 2013, 21 pages.
3rd Generation Partnership Project; (3GPP) TS 32.240, V12.0.0; 3rd Generation Partnership Project; Technical Specification Group Services and System Aspects; Telecommunication Management; Charging Management; Charging Architecture and Principles, (Release 12), Mar. 2013, 45 pages.
European Telecommunications Standards Institute (ETSI) TS 102 690, V1.2.1; Machine-to-Machine Communications (M2M); Functional Architecture, Jun. 2013, 279 pages.
European Telecommunications Standards Institute (ETSI) TS 102 690, V2.0.14; Technical Specification; Machine-to-Machine Communications (M2M); Functional Architecture, Jul. 2013, 332 pages.
European Telecommunications Standards Institute (ETSI) TS 102 690 V2.0.1; Recording Information for Statistical and Offline Charging in M2M; Ericsson; Machine-to-Machine Communications (M2M); Functional Architecture, Mar. 2012, 9 pages.
International Application No. PCT/US2014/047951: International Search Report and Written Opinion dated Jan. 20, 2015, 20 pages.
OneM2M-TS-0001; OneM2M Functional Architecture V 0.0.3; Jun. 8, 2013, 11 pages.
Japanese Application No. 2016-530046: Notice of Reasons for Rejection dated Dec. 26, 2016, 5 pages.
WG2 Leadership et al: "List of oneM2M CSFs—call for contributions", onem2m-arc-2013-0304R04-list_of_onem2m_CSFS_-_call_for_contributions.doc, oneM2M, vol. WG2—Architecture, ARC, Jul. 17, 2013, 6 pages.
onem2m-ts-0001-functional_architecture-v0_0_4, Jun. 29, 2013, pp. 1-22.
"3rd Generation Partnership Project; Technical Specification Group Core Network and Terminals; Study on XML based access of AF to the PCRF (Release 12)", Jun. 8, 2013, 36 pages.

* cited by examiner

SERVICE DOMAIN CHARGING SYSTEMS AND METHODS

CROSS REFERENCE TO RELATED APPLICATIONS

This application claims the benefit of, and incorporates herein by reference, U.S. Provisional Application 61/886,458 "Service Domain Charging System and Interactions with Underlying Networks" filed Oct. 3, 2013 and U.S. Provisional Application 61/857,912 "Service Domain Charging System and Interactions with Underlying Networks" filed Jul. 24, 2013. The disclosures of each application listed in this paragraph are hereby incorporated by reference as if set forth in their entireties herein.

BACKGROUND

Machine-to-machine (M2M) technologies allow devices to communicate more directly with each other using wired and wireless communications systems. M2M technologies enable further realization of the Internet of Things (IoT), a system of uniquely identifiable objects and virtual representations of such objects that communicate over a network, such as the Internet. IoT may facilitate communication with even mundane everyday objects, such as products in a grocery store, and thereby reduce costs and waste by improving knowledge of such objects. For example, stores may maintain very precise inventory data by being able to communicate with, or obtain data from, objects that may be in inventory or may have been sold. M2M technologies introduce new challenges in charging for services, such as determining who can charge for services, who should be charged for such services, and what operations are chargeable.

SUMMARY

Disclosed herein are methods, devices, and systems related to a service domain charging system that can interact with underlying networks. A service domain charging architecture may include several logical functions, including a Service Domain Charging Management (SD-CM), a Service Domain Online Charging System (SD-OCS), a Service Domain Offline Charging System (SD-OFCS), and a Service Domain Charging Trigger Function (SD-CTF). Service-based charging types may be created and applied to existing event, session, online, and offline charging mechanisms. Service domain charging messages may be exchanged over the X, Y, Z reference points. An E reference point may be used for interfacing with a service domain billing system, and a B reference point may be used between a service domain billing system and the underlying network's billing system.

One embodiment is a method including receiving a policy at a service domain charging management function in a service layer of an M2M network. This policy is defined as a rule with associated attributes. The method also includes using the policy to determine chargeable events within the service layer of the M2M network.

An exemplary charging system for an M2M service domain can include a service domain charging management function to store charging policies for the service domain; a service domain on-line charging system receiving service requests from the service domain charging management function and checking the credit for the requested service before granting the service; and a service domain off-line charging system receiving charging events from the service domain charging management function and producing service domain charging data records.

One embodiment is a method including receiving at a service domain charging management function at an infrastructure node charging policies for the service domain. The method can include distributing the policies from the service domain charging management function at the infrastructure node to a service domain charging management function at an end node.

One embodiment is a method including transferring charging information between a service domain charging system in the service layer and a Machine-Type Communications Interworking Function (MTC-IWF) in a 3GPP network across a Tsp reference point. The method also includes using the transferred charging information in the service domain charging system in the service layer or the MTC-IWF in the 3GPP network.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

DETAILED DESCRIPTION OF ILLUSTRATIVE EMBODIMENTS

The European Telecommunications Standards Institute (ETSI) architecture defines an offline charging system for M2M technologies. In some embodiment integrating aspects of this architecture, charging information, in the form of Charging Data Records (CDRs), may be derived from recorded information and transferred to a Charging Server. All information required for charging may first be selected for recording. There may be a one to one mapping between a recorded M2M event and a CDR.

Figure 1:
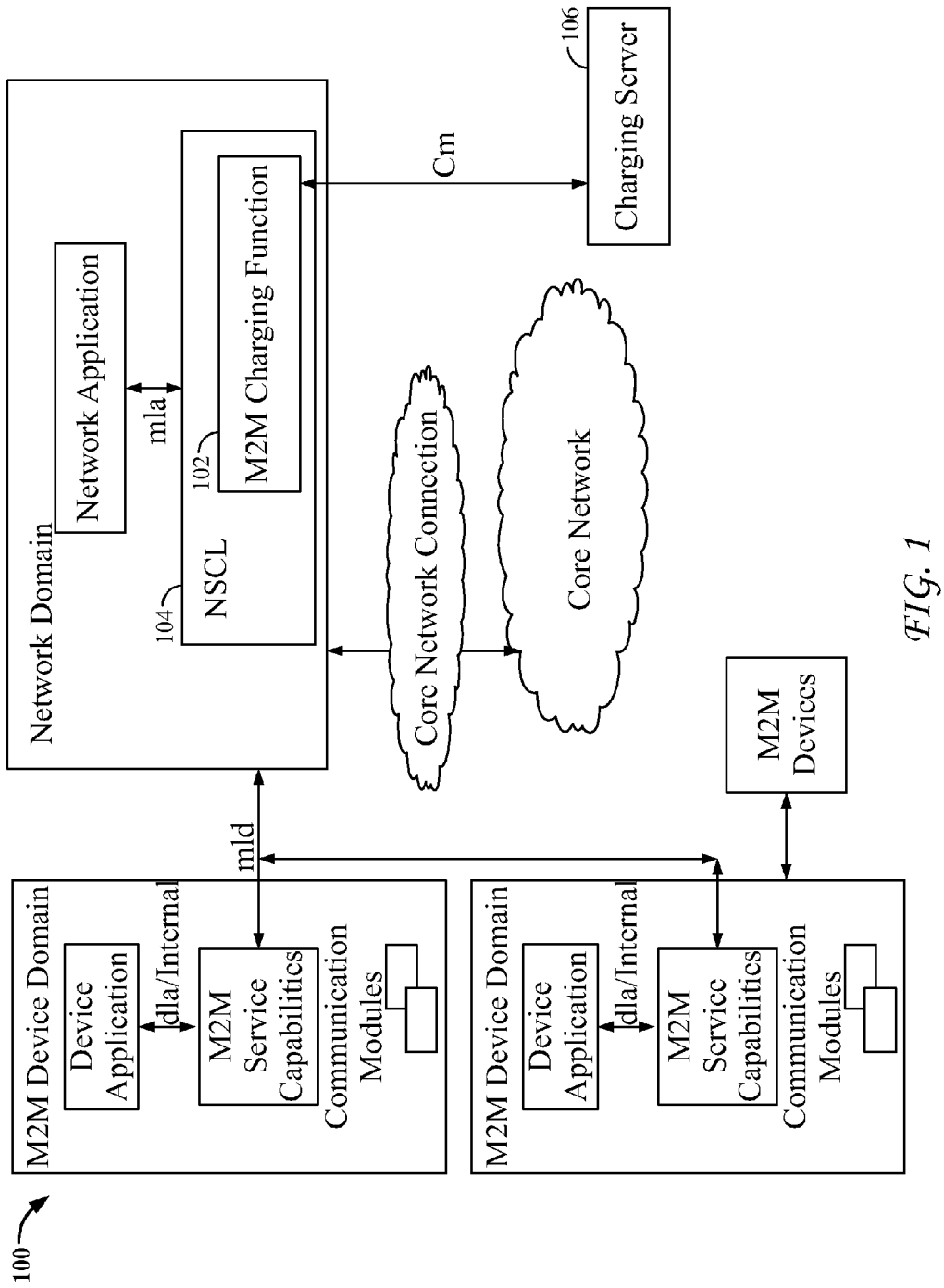
FIG. 1 is a diagram that illustrates an exemplary, non-limiting charging architecture according to an embodiment.

FIG. 1 is a diagram that illustrates an exemplary, non-limiting charging architecture 100 according to an embodiment. In such an embodiment, the Charging Function (CF) 102 embedded within the M2M Network Service Capability Layer (NSCL) 104 may be responsible for interaction with the Charging Server 106 using the Cm reference point. Diameter may be used as the protocol for the Cm reference point.

Figure 2:
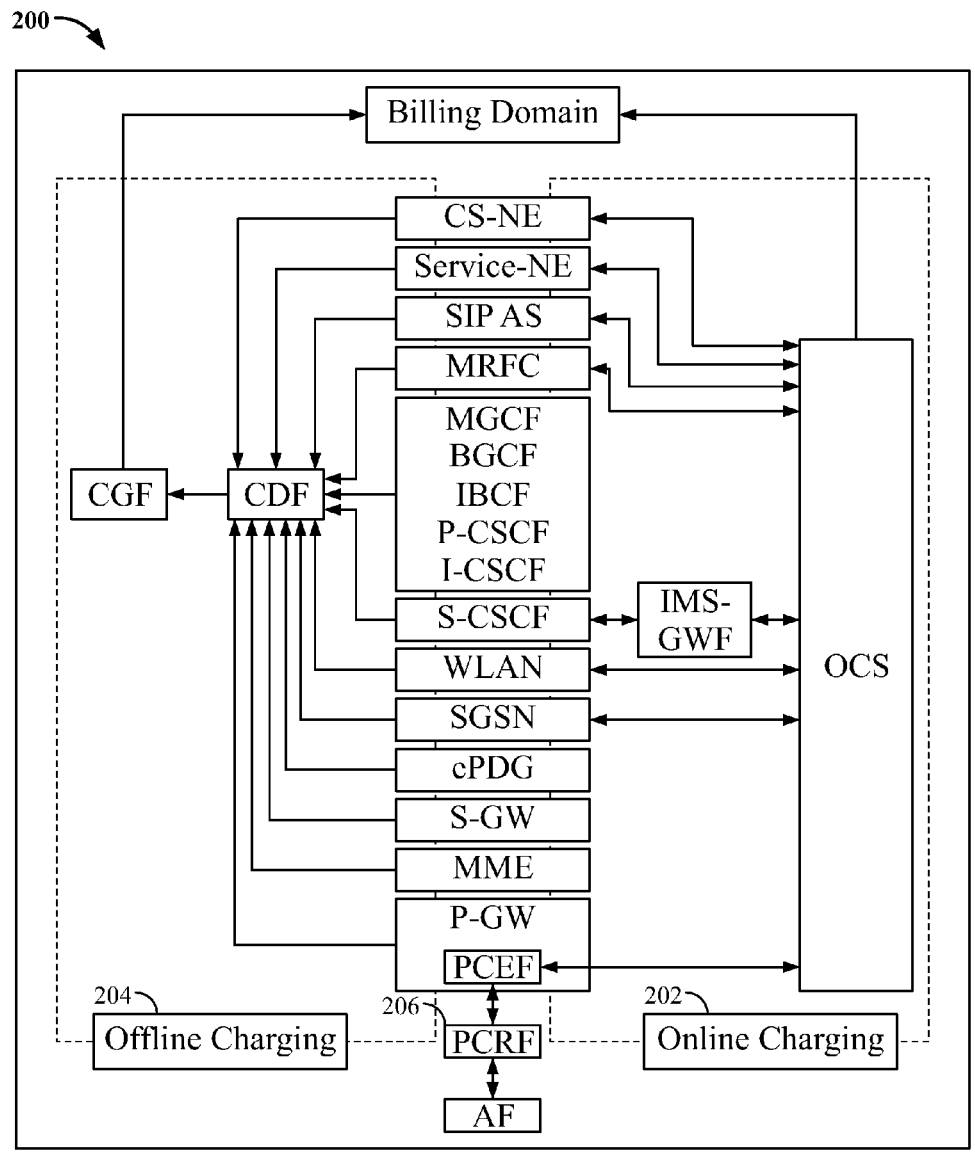
FIG. 2 is a diagram that illustrates an exemplary 3GPP PCC system with Online charging and Offline charging.

FIG. 2 is a diagram that illustrates an exemplary 3GPP PCC system 200 with Online charging 202 and Offline charging 204 as well as other involved entities. A 3rd Generation Partnership Project (3GPP) Policy and Charging Control (PCC) system may be responsible for Quality of Service (QoS) and charging for IP Connectivity Access Networks (IP-CANs) (e.g., EPS, UMTS, fixed, I-WLAN, etc.). The PCC architecture may include a number of functions with specified interfaces between them. The Policy and Charging Rules Function (PCRF) 206 may be responsible for creating Policy and Charging related information for IP-CAN sessions, IP-CAN bearers, and/or Service Data Flows (SDFs). 3GPP may support both Offline charging 204 and Online charging 202. Offline charging 204 is a mechanism where charging information does not affect, in real-time, the service rendered, such as post-paid subscribers. On the contrary, the Online Charging System (OCS) 202 performs charging functions, such as Credit Control, in real-time. This allows the OCS 202 to affect service execution in real-time, typically for pre-paid subscribers. Various charging models are supported in 3GPP, including volume-based charging, time-based charging, combined volume- and time-based charging, event-based charging, and no charging.

Figure 3:
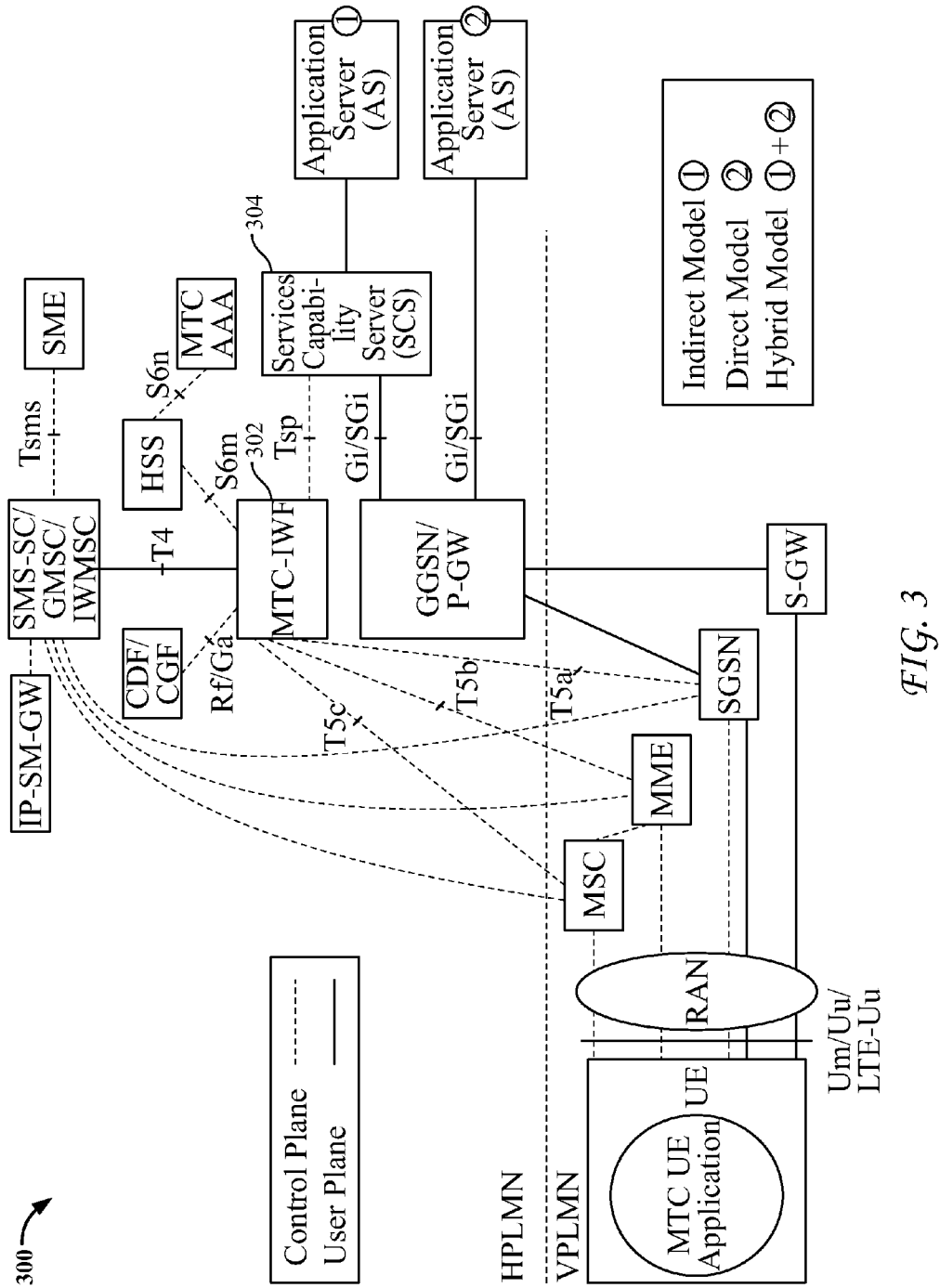
FIG. 3 is a diagram that illustrates another exemplary, non-limiting architecture having exemplary MTC-IWF interfaces with a 3GPP Offline charging system using the Rf/Ga reference points

FIG. 3 is a diagram that illustrates another exemplary, non-limiting architecture 300 having exemplary MTC-IWF interfaces with a 3GPP Offline charging system using the Rf/Ga reference points. The MTC-IWF (Machine Type Communications-InterWorking Function) entity 302 interfaces a M2M service capability server 304. Tsp may provide the control plane interface and Gi/SGi may be the user plane interface.

Figure 4:
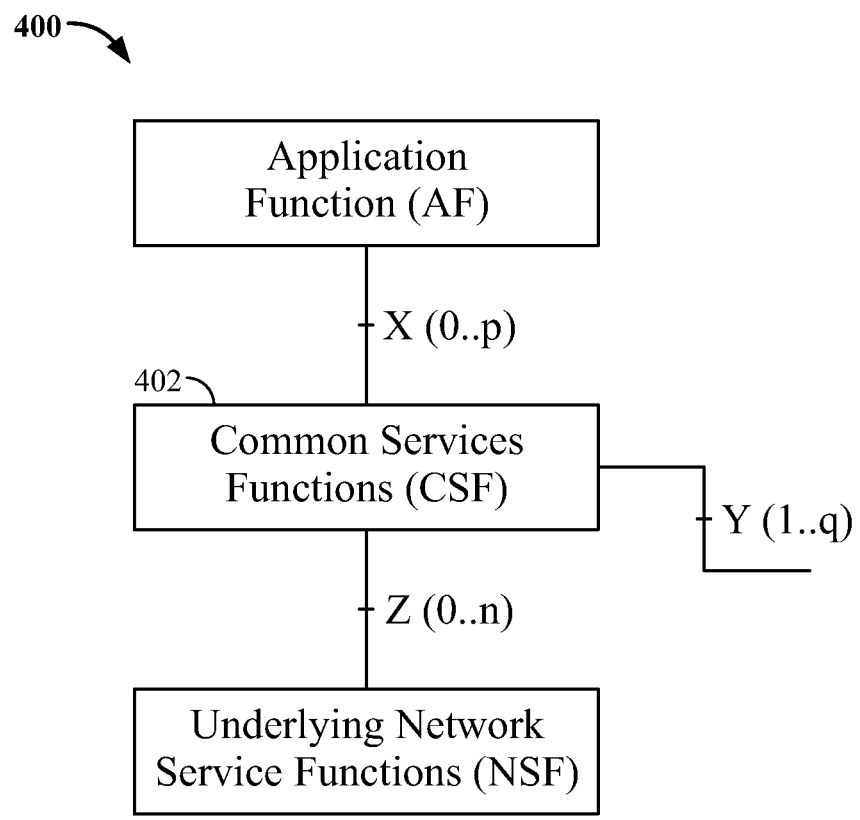
FIG. 4 is a diagram that illustrates exemplary, non-limiting, one M2M architecture.

FIG. 4 is a diagram that illustrates an exemplary, non-limiting, one M2M architecture 400. one M2M is a recently proposed standard at an early stage of architecture design. A central part of one M2M is a Common Service Entity (CSE) that consists of multiple Common Service Functions (CSFs) 402. A CSF 402 in a CSE may be a service such as Registration, Security, Charging, data management, etc. A CSE may reside in M2M end nodes (e.g., devices), intermediate nodes (e.g., gateways), and infrastructure nodes (e.g., network platforms). one M2M defines three reference points, an X reference point between Applications and CSE, a Y reference point between two CSEs, and a Z reference point between CSE and the underlying networks. one M2M has updated the reference point names from X, Y and Z to the Mca, Mcc and Mcn. The operations apply to the Mcc reference point also apply to the Mcc' reference point, which is between inter service provider domains. Some exemplary one M2M charging requirements are illustrated below in Table 1.

TABLE 1

Exemplary oneM2M Requirements for Charging

| Requirement ID | Description |
| --- | --- |
| CHG-001 | The M2M system shall support collection of charging specific information related to the individual services facilitated by the system (e.g. Data Management, Device Management and/or Connectivity management), and concurrently with the resource usage. The format of the recorded information shall be fully specified including mandatory and optional elements. |
| CHG-002 | The M2M system shall support mechanism to facilitate correlation (e.g. subscriber identity) of charging information collected for different services, including those provided by the underlying network operator |
| CHG-003 | The M2M system shall be able to reuse existing charging mechanisms of underlying networks. |

TABLE 1-continued

Exemplary oneM2M Requirements for Charging

| Requirement ID | Description |
| --- | --- |
| CHG-004 | The M2M system shall support transfer of the charging information records to the Billing Domain of the M2M Service Provider, for the purpose of subscriber billing, inter-provider billing, and/or provider-to-subscriber accounting including additional functions like statistics. |
| CHG-005 | The M2M system should support generation of charging events for the purpose of requesting resource usage authorization from the real time credit control system where the subscriber account is located. The information contained in the charging events and the relevant chargeable events shall be fully specified including mandatory and optional elements. A chargeable event may be any activity a provider may want to charge for that utilizes the resources and related M2M services offered by such provider. A charging event is the set of charging information needed by the credit control system for resource authorization. |

In the M2M service domain, which, as used herein, refers to M2M services provided by an M2M service provider, including the Service Capability Layer (SCL) of the ETSI M2M architecture and the CSE and CSF of a one M2M architecture, new challenges are presented for charging, as there are more complex stakeholders and new charging scenarios in such embodiments. Table 2 below lists some exemplary charging scenarios at the service domain, each of which may be combined with others (shown in Table 2 or otherwise).

TABLE 2

Exemplary Service Domain Charging Scenarios and Stakeholders

| Chargeable Events/Operations | Description | Entities to charge | Entities being charged | Charging schemes |
| --- | --- | --- | --- | --- |
| Subscription | Charging is based on each M2M service domain subscription. The M2M Service Provider charges the M2M service subscriber. | Service Provider | A service subscriber can be a CSE or an application. It has a unique service subscriber ID. | Most likely fix rate, e.g. monthly fee |
| Service connection | Service subscribers are charged per secure service connection. One subscriber can have multiple service connections. | Service Provider | Service subscriber | The rate is determined per service connection; by connection duration. Charging event is finished when the service connection tears down |
| Service Registration | Charging is based on service domain registrations | Service Provider | The entity that registers to the service domain, e.g. an Application or CSE or CSF | The rate is determined per registration |
| Data Operations | Charging is based on basic operations on data, such as creation, update, retrieval, deletion, usage of storage space, etc. For example, an Application A writes data to a service domain, and got charged by the service provider. When application B reads the data it gets charged by Application A (or by both Application A and the Service Provider) | 1)Owner of the data 2)both owner of the data and the service provider 3) service provider | 1) receiver of the data 2)owner of the data | Owner of the data can charge the entity that uses the data; owner of the data can be charged by the service provider for data storage and sharing services |
| Service Based Operations | Charging is based on a service, thus it can contain a series of operations to achieve the service. For example, Application A requests certain data from a service provider. The service provider performs a series of | 1) Service Provider 2) Owner of the data | Entity that request the service, such as an application, a CSE. | The rate is determined per service |

TABLE 2-continued

Exemplary Service Domain Charging Scenarios and Stakeholders

| Chargeable Events/Operations | Description | Entities to charge | Entities being charged | Charging schemes |
|---|---|---|---|---|
| | actions to read and gather the data for Application A. The service provider is charged by the owner of the data, and the service provider charges Application A for the service. | | | |

The service domain may use the following functions to support charging:
  Efficient mechanisms and interfaces to enable service domain charging that may be self-sufficient and that may be independent of underlying networks
  Mechanisms and interfaces that enable the service domain to interact with and re-use the underlying network charging system when converged charging is desired
  Service domain charging mechanisms to support online, offline, and new charging types that may be used by the service domain The above functions may not be sufficiently addressed by existing charging systems. A 3GPP charging system may not address such functions and may not be applicable to service domain charging. ETSI M2M charging may only provide limited charging functions. ETSI M2M defines simple information recording at the network service capability layer and only addresses offline charging. It does not provide any mechanisms for charging policy control. ETSI M2M also may not define a mechanism to re-use 3GPP charging. Therefore, ETSI M2M charging is very basic and may not meet the requirements of a complete M2M charging system. one M2M, as a new standard under development, has not yet defined any charging functions and procedures.

Therefore, according to the embodiments set forth herein, mechanisms may be used for a service domain charging system that may interact with one or more underlying networks. More specifically, embodiments are described herein that provide for an overall service domain charging architecture, defining logical functions (e.g., SD-CM, SD-OCS, SD-OFCS and SD-CTF), their functionalities, and their relationships. Embodiments are also described herein that define a service based charging type and that apply existing event, session, online, and/or offline charging in the context of service domain. Embodiments are also described herein that define service domain charging messages over the X, Y, Z reference points. Furthermore, the current disclosure describes an E reference point for interfacing with a service domain billing system and a B reference point between the service domain billing system and an underlying network's billing system. The current disclosure also sets forth an architecture, messages, and interactions with the 3GPP charging system. Embodiments are further set forth for ETSI M2M charging. Defined resource (i.e., data) structure and procedures supporting the disclosed mechanisms are also set forth herein. Note that while the terms used herein may be associated with the one M2M architecture, standards, and related documents, the presently disclosed embodiments may be applied to any service domain charging system.

Various charging types may be supported at the service domain in the embodiments described herein. Each may support the possible charging scenarios described above in Table 2. The terms used in 3GPP charging may be used herein for simplicity, such as Online/Offline charging, with the functionalities expanded according to the described embodiments to provide more flexibility in the service domain for new charging scenarios. A service based charging type is set forth herein to satisfy service domain requirements.

In addition to the traditional session-based and event-based charging, the service domain may provide unique service-based charging. Since a CSE may contain many different CSFs, and it may also manage "big" data, a CSE may perform a complex request that involves a series of actions, multiple inputs, and multiple decisions. Such a request may result in the requestor being charged by the service rather than for one or more steps of an operation.

A service domain may have its own sessions or may be session-less. In the context of charging, the term "session" as used herein has a broad scope. A service session may be a subscriber's subscription to a specific service provider and/or it may be a logical service connection. A subscriber may have multiple service connections. For example, a service registration may be in process, such as when a CSE in an end node registers to a CSE in an infrastructure node. Such registration may be considered a session and charging may be done per registration. A session may be identified by a unique service session identifier (ID) and may be associated with a subscriber ID, a session duration, a service session QoS, and/or other information that may affect charging.

Service Domain Events may refer to non-continuous transactions, such as an operation on data (e.g., Create, Update, Retrieval, etc.).

Service domain charging methods may be divided into Online and Offline charging, in some embodiments based on how charging affects real time services, similar to the concepts of Online and Offline charging in 3GPP. Offline charging may not affect services provided in real time. Charging triggering information may be generated at the CSFs where it happens. A charging report with Offline charging data may be passed via different nodes to the network to generate Service Domain CDRs (SD-CDRs). Online charging may affect services granted in real time. A service request may first be generated and the requestor's credit may be checked before the service is granted. Whether a service uses Online or Offline charging may be based on service sessions or events. For example, an application may create data in the service domain and specify that reading the data is event-based Online charging with a certain rate. A subscriber (e.g., a user, an application) may be charged by using a combination of both Online and Offline charging mechanisms.

Figure 5:
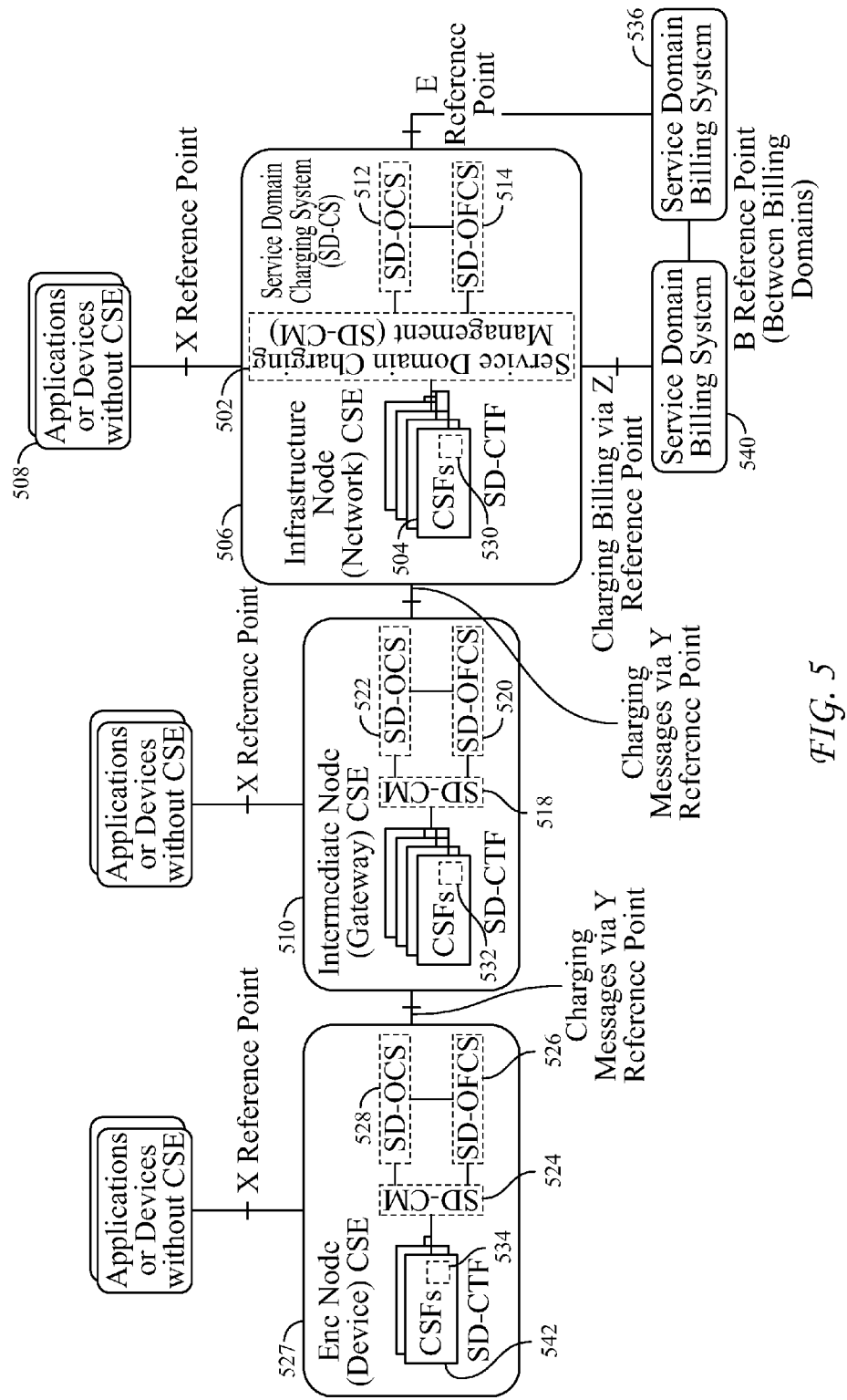
FIG. 5 is a diagram that illustrates an exemplary, non-limiting, Service Domain Charging System (SD-CS) including the locations of some exemplary logical functions and exemplary scenarios for deployment.

The Service Domain Charging System (SD-CS) may consist of four logical functions. FIG. 5 is a diagram that illustrates an exemplary, non-limiting, Service Domain Charging System (SD-CS) including the locations of some exemplary logical functions and exemplary scenarios for deployment. The dotted lines of architecture 500 indicate optional functions in the node. Architecture 500 may support both a centralized charging system with control at the infrastructure node and a distributed charging system with control over different nodes. Described below are features of the functions and call flows and messages for charging.

The Service Domain Charging Management (SD-CM) 502 may be central to SD-CS. The SD-CM 502 may contain charging policies that the CSE 506 supports. It may obtain charging policies by provisioning and/or configuration. The policies may be obtained from the service provider or they may be configured by an application 508 or another CSE 510. The SD-CM 502 may also update its policy based on statistics of chargeable events at the service layer. The SD-CM 502 may have internal interfaces with other CSFs in the same CSE 506. The SD-CM 502 may configure other CSFs 504 regarding chargeable events and policies.

The SD-CM 502 may serve as the aggregator and dispatcher of charging information. It may receive charging requests and events from other CSFs 504. The SD-CM 502 may dispatch the requests to either Service Domain Online Charging System (SD-OCS) 512 or the Service Domain Offline Charging System (SD-OFCS) 514. The SD-CM 502 may get output from the SD-OCS 512 and/or the SD-OFCS 514 and may send the information to either the Service Billing Domain or an underlying network's charging system, based on the policy. The SD-CM 502 may be the anchor point for interactions among the SD-CS in different nodes (such as infrastructure nodes, intermediate nodes, and end nodes). The SD-CM 502 may also be the anchor point for the SD-CS to interface and interact with an underlying network for charging related operations.

The Service Domain Offline Charging System (SD-OFCS) 514 may receive offline charging events from a SD-CM 502 and generate SD-CDRs and SD-CDR files. The Service Domain Online Charging System (SD-OCS) 512 may receive service requests, check credit, and grant services. The SD-OCS 512 can maintain the credit information for different entities.

An intermediate node or an end node may or may not have one or both of the SD-OFCS 514 and the SD-OCS 512 depending on the deployment. The SD-CM 502 in the infrastructure node may configure the SD-CM 518, SD-OFCS 520, and SD-OCS 522 in the intermediate node 510 and the SD-CM 524, SD-OFCS 526, and SD-OCS 528 in the end node 527 so charging can be done locally in order to reduce traffic between the nodes and increase response time.

One or more Service Domain Charging Trigger Function (SD-CTF) 530, 532, and 534 may reside in the CSFs as shown in the small boxes of FIG. 5. Some CSFs may not have a SD-CTF function. SD-CM 502 may configure the SD-CTF 530 regarding chargeable events and how to report.

The SD-CS 502 may advertise its charging related information, such as rate, to other CSEs or applications via the Y or X referent point. The SD-CS 502 may utilize the charging and billing system in the underlying networks via the Z reference point. Internal to the SD-CS, the SD-OCS 512 and SD-OFCS 514 may communicate with each other. Further details about such embodiments are provided herein.

The service domain may have its own billing system 536. The SD-CS in the infrastructure node 506 may communicate with the service domain billing system 536 via a reference point referred to as E. The E referent point connects the M2M service domain (e.g., CSEs) to external lateral systems that are not applications or underlying networks. The billing domain may be a third party application, such as PAYPAL. The service domain may exchange charging and billing information with the billing domain via the E reference point. The service domain billing system 536 may also have a B reference point with the billing system 540 in the underlying system since they may come from different providers.

When there is no SD-CM in an end node 527, the SD-CM 518 in the intermediate node 510 or SD-CM 502 in the infrastructure node 527 where the end node registers may act as a proxy and aggregator for charging. Such a SD-CM 518 in the intermediate node 510 or a SD-CM 502 in the infrastructure node 527 may collect charging events and store and apply charging policies for the end nodes. In some cases there is no SD-CTF in the end node 527 as well. The transactions and charging related to the end node 527 may be captured at the intermediate node 510 or infrastructure node 506.

Illustrated in the figures are operations by the SD-CS at the infrastructure node 506 and the end node 527. The same concepts and procedures apply to the intermediate nodes 510. Multi-hop charging operations are possible, for example where the SD-CS in the infrastructure node 506, intermediate node 510, and end node 527 communicate with each other. While the figures show that the charging events may occur at the end node 527, charging events may also occur at the intermediate node 510 or the infrastructure node 506. If they occur at the infrastructure node 506, the SD-CS at the infrastructure node may process the charging information. The SD-CS may choose to push the charging information to the intermediate node 510 or the end node 527 for sharing of information.

Figure 6A:
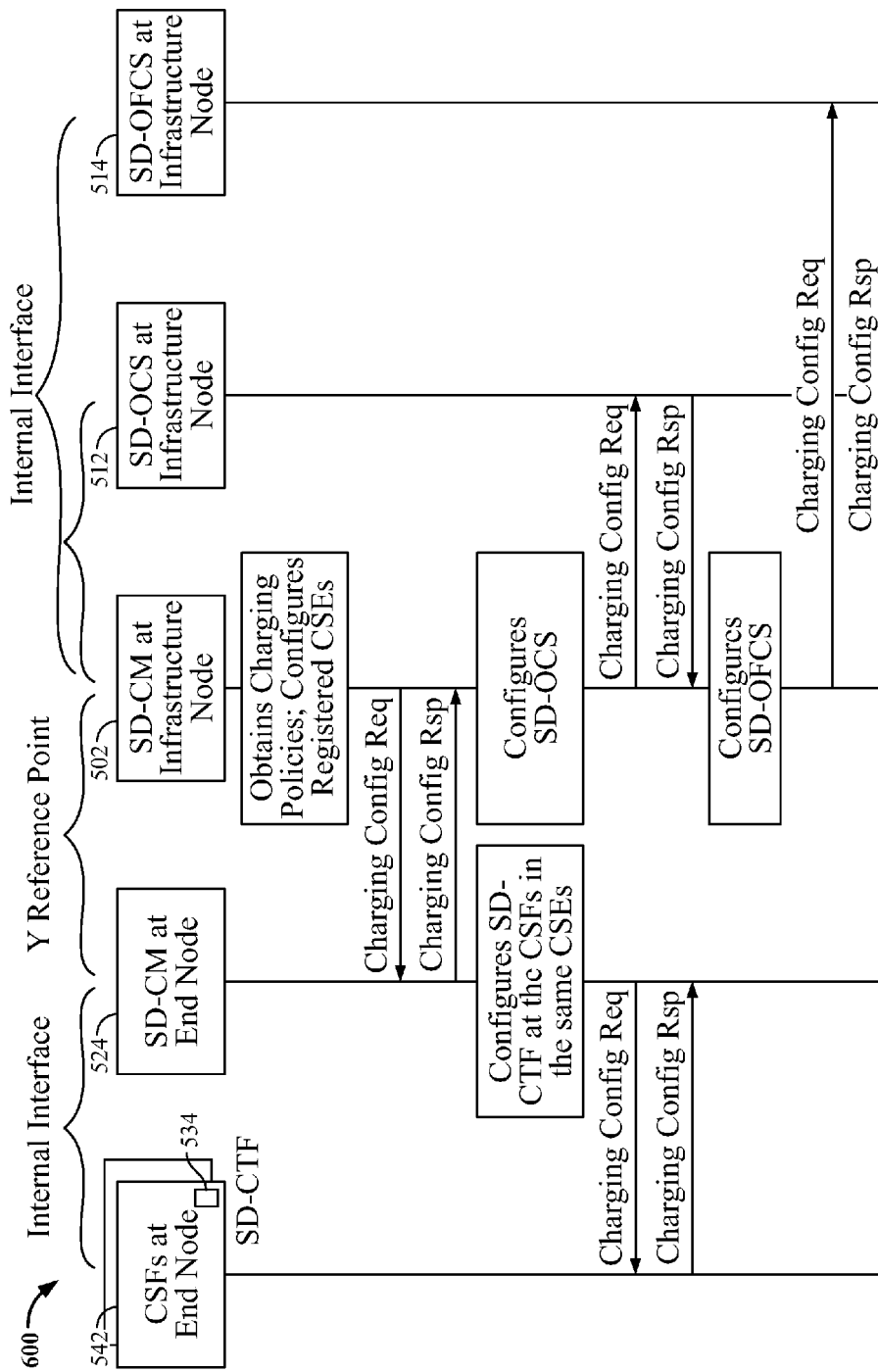
FIG. 6A is a flow chart that illustrates an exemplary charging policy configuration procedure.

FIG. 6A is a flow chart that illustrates exemplary charging policy configuration procedure 600. Note that the flow indicates one possible common scenario when the SD-CM 502 in the infrastructure node 506 obtains charging policies and configures the charging functions in other registered CSEs 510 and 527. Other scenarios not shown that may be supported by various embodiments include where an application 508 may provide its own specific charging policy to an SD-CM 502 via the X reference point. Such a policy may be exchanged and configured between the CSEs in different nodes. The CSEs may also facilitate the advertising and exchange of policies between different applications. For example, an M2M app in an app store may use the X reference point to push its own charging policy or it may query an existing charging policy on a service domain. The app may be an entity to collect the charge. Another scenario not shown that may be supported by various embodiments may be where a charging policy may also be initiated and populated from an intermediate node 510 and an end node 527, and verified and aggregated by the SD-CM 502 in the infrastructure node 506. Yet another scenario not shown that may be supported by various embodiments may be where a charging policy may be updated dynamically over time. For example, a change of rates, chargeable events, etc. may be updated. Such updates can be initiated by applications or CSEs at different nodes.

Figure 6B:
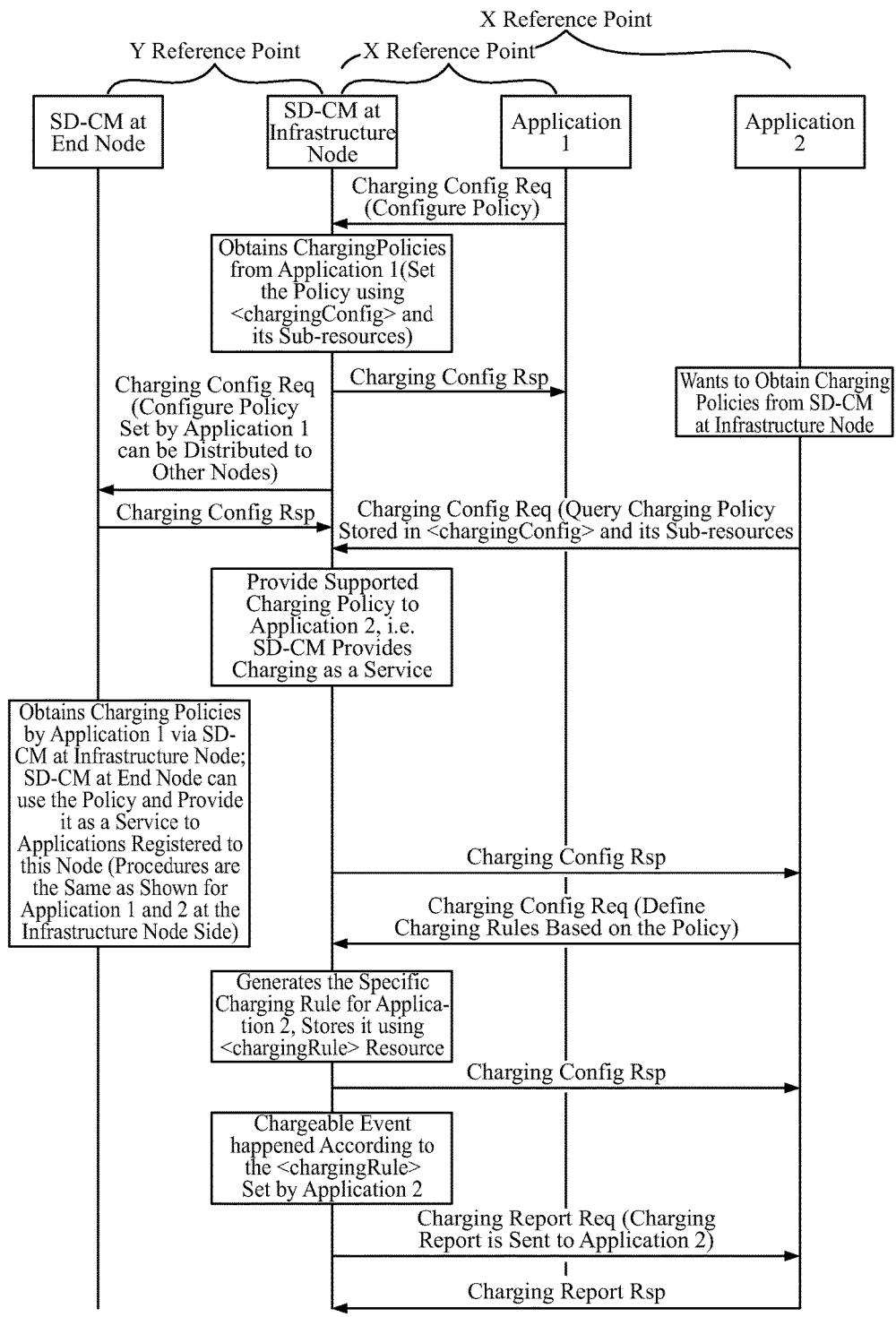
FIG. 6B is a flow chart that illustrates an exemplary charging policy configuration procedure in which an application provides the charging policy to the SD-CM.

FIG. 6B is a flow chart that illustrates an exemplary charging policy configuration procedure in which an application provides the charging policy to the SD-CM. SD-CM can provide the charging policy established by one application to other applications. The application that configures the charging policy can collect chargeable events and charge other applications via service domain. If authorized, the SD-CM can distribute the charging policies to other nodes.

Examples of charging policies include supported charging types (e.g., Online, Offline, Service Based), association of subscriber ID and application/subscriber types with charging types (e.g., Online, Offline, Service Based), association of subscriber ID, application/subscriber types, and service domain operations with rate, a list of chargeable events, chargeable event reporting parameters, and credit reservation trigger and threshold.

Figure 7:
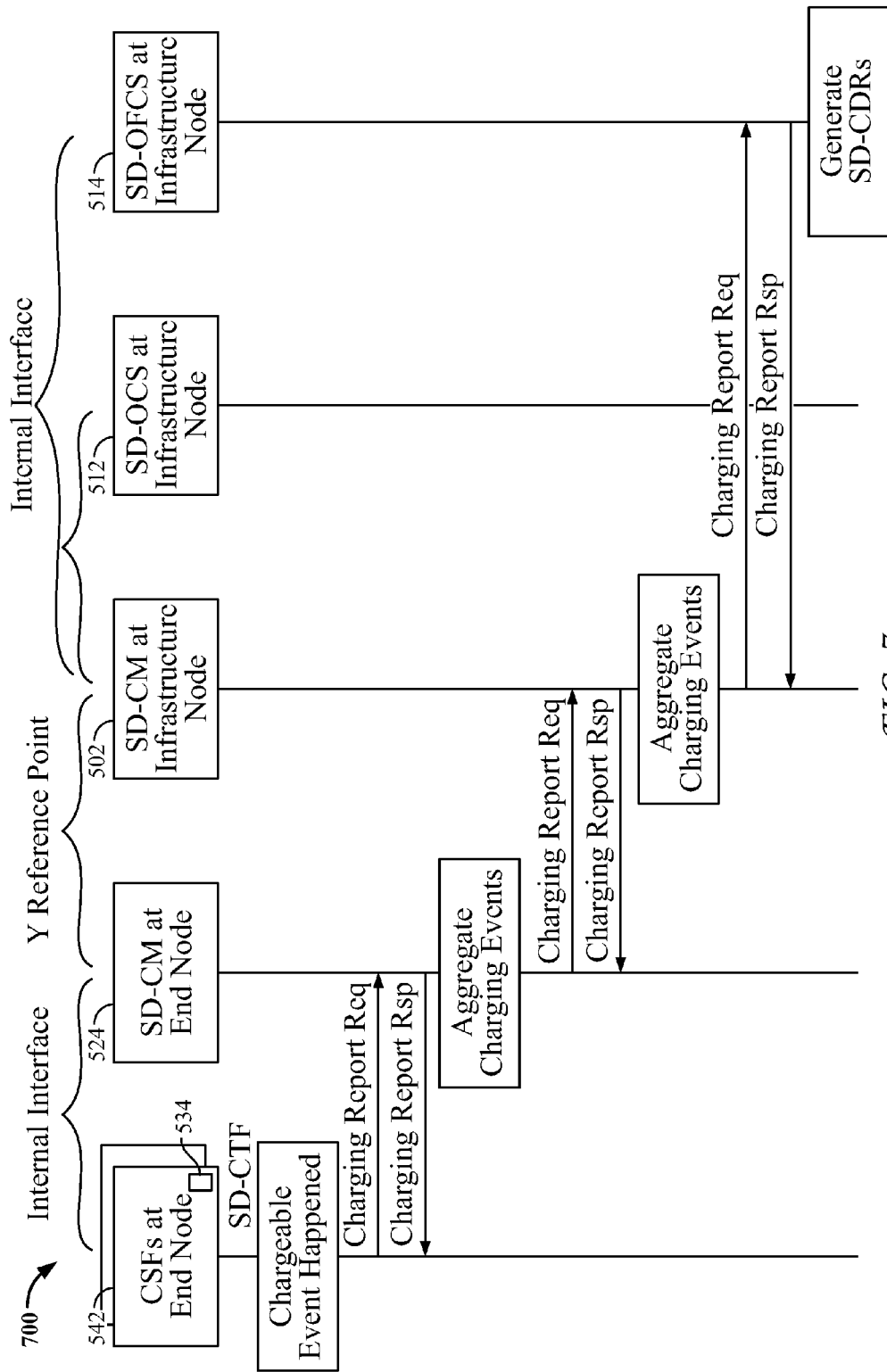
FIG. 7 is a flow chart that illustrates an exemplary service domain offline charging procedure.

FIG. 7 is a flow chart that illustrates exemplary service domain offline charging procedure 700, where, in the shown embodiment, it is assumed that there is no SD-OFCS at the end node. When a chargeable event happens, the SD-CTF 534 at the CSF 542 reports the event. The SD-CM 524 at the end node 527 may aggregate these reports before sending them to the infrastructure node 506.

Figure 8A:
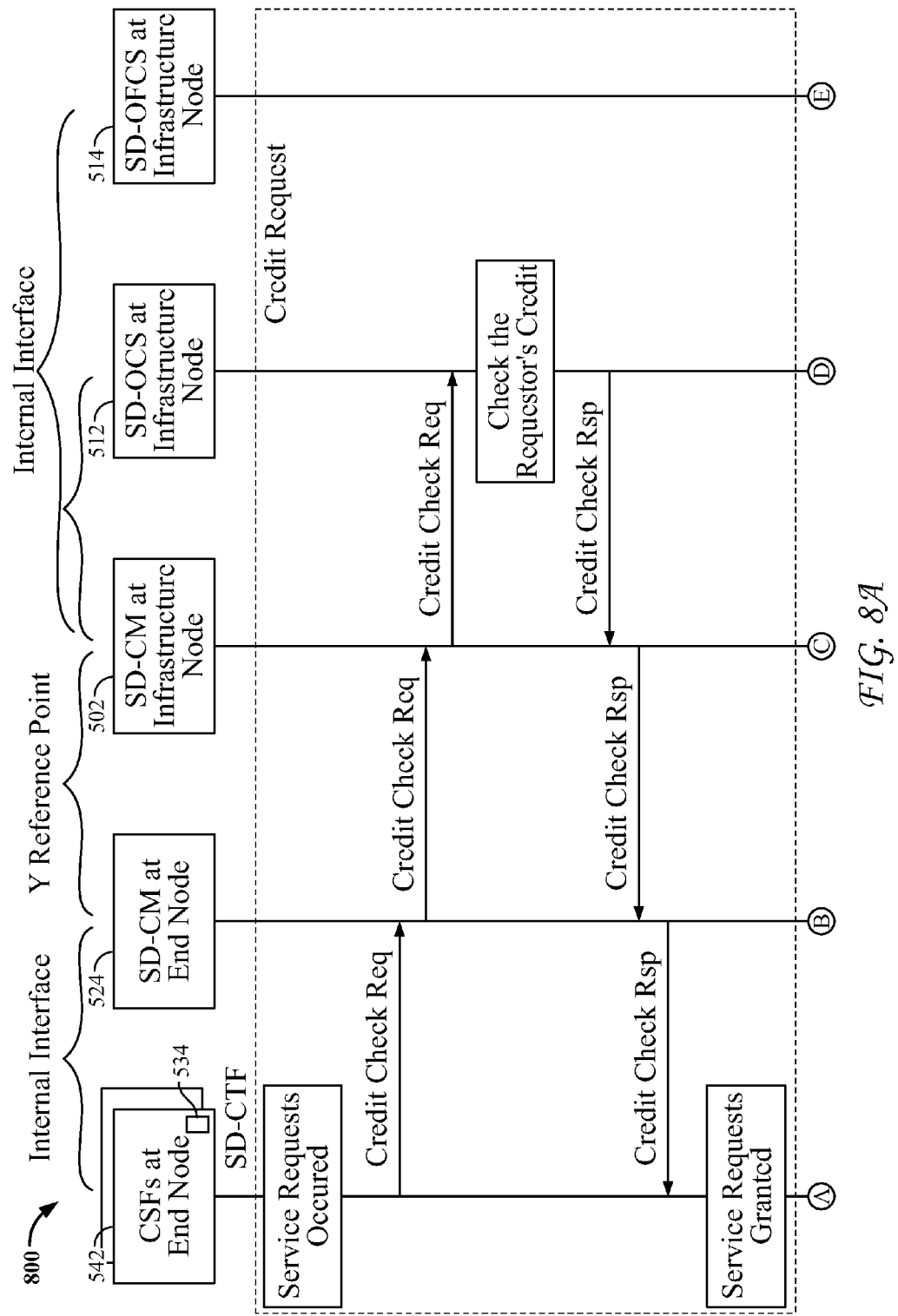
FIGS. 8A and 8B are a flow chart that illustrates exemplary procedures for online charging, including procedures for a credit request and a credit reservation.
Figure 8B:
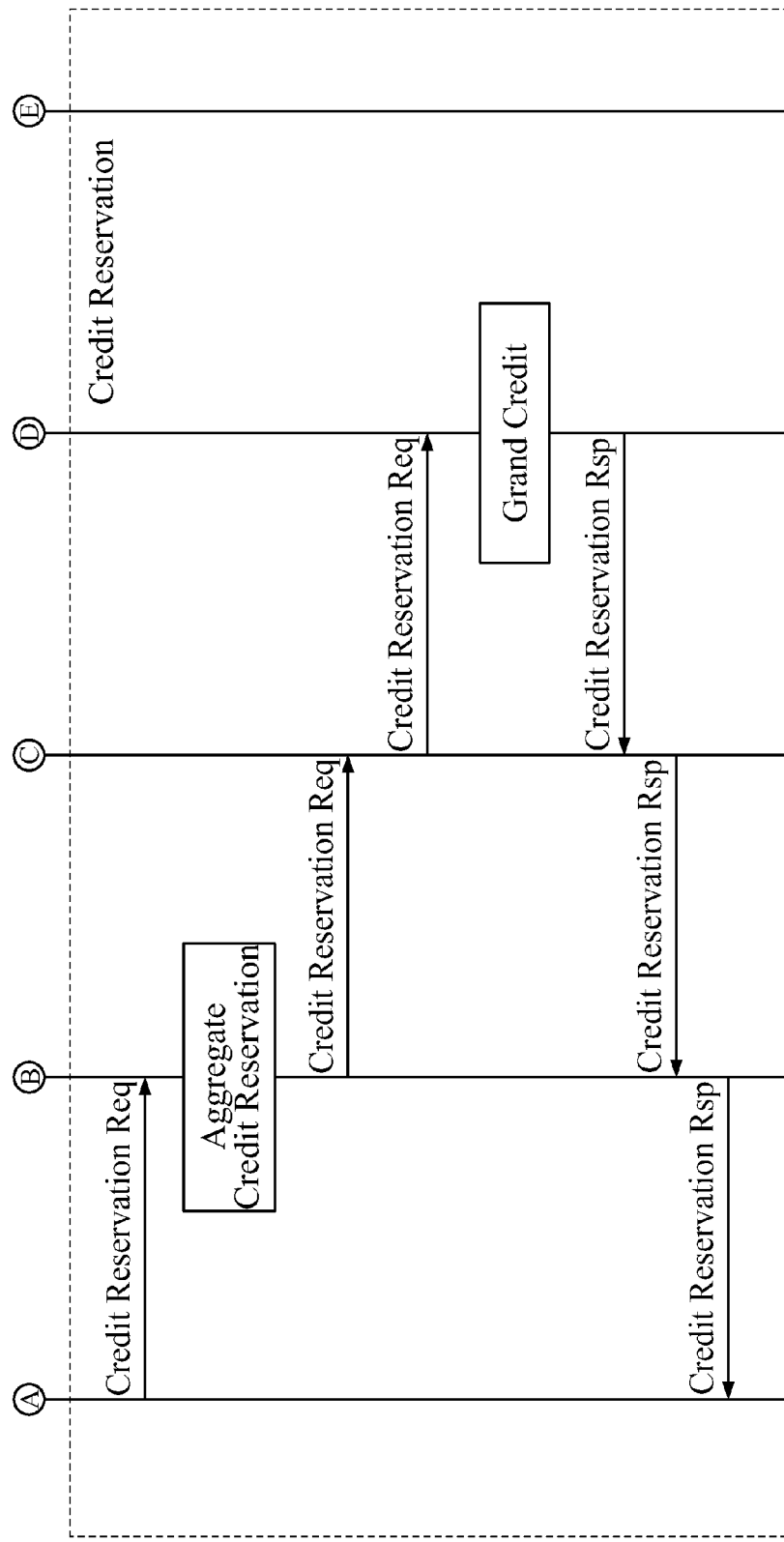

FIGS. 8A and 8B are a flow chart that illustrates exemplary procedures 800 (not necessarily shown in sequential order) for online charging, including procedures for a credit request and a credit reservation. In Online charging embodiments, a requestor (e.g., an application, a subscriber, a CSE, etc.) must have enough credit to pay for a service before the service is granted. If there is not enough credit, the request may be denied. The charging related information may be provided in the rejection message, such as lack of credit and charging rate. This rejection may trigger other actions at the service domain, such as starting the credit reservation action or negotiating a new rate using charging configuration messages. The requestor may also reserve credit before service requests, for example, by requesting the reservation of enough credit to pay for a retrieval operation of certain data for 20 times.

Note that FIG. 8 only illustrates one possible scenario when there is no SD-OCS at the end node 527. When there is SD-OCS 528 at the end node 527, the SD-OCS 512 at the infrastructure node may push credit information and decision making for specific requestors to the SD-OCS 528 at the end node 527 using a Charging Config message. Thus the procedure of such an embodiment is more distributed and localized at the end node 527. The SD-OCS 528 at the end node or the intermediate node 510 may send one or more reports to the SD-OCS 510 at the infrastructure node 506 using the Charging Report message so that they may synchronize credit information.

Figure 9:
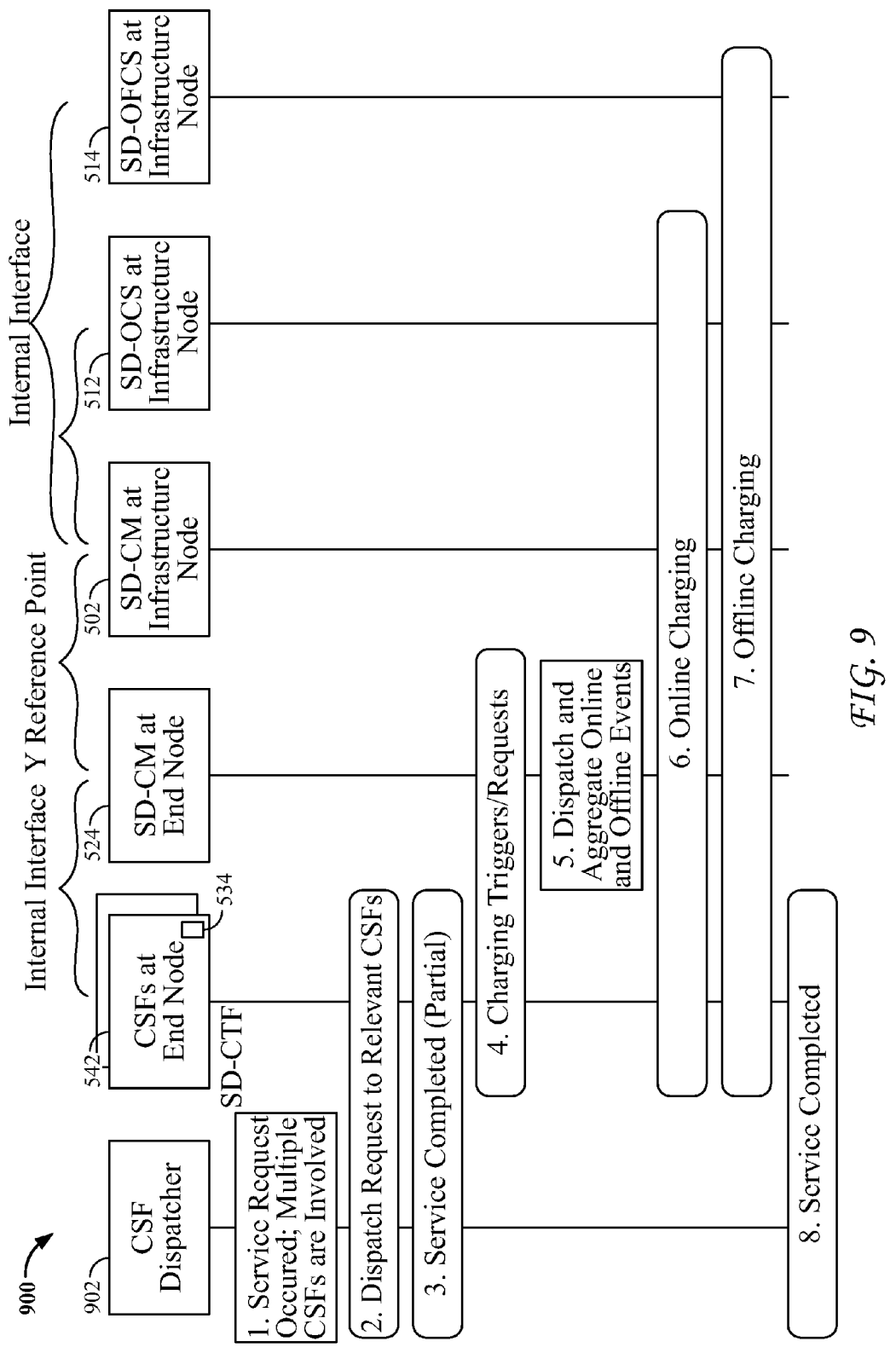
FIG. 9 is a flow chart that illustrates exemplary procedures for service based charging.

FIG. 9 is flow chart that illustrates exemplary procedures 900 for service based charging. The steps illustrated are reduced in detail for simplicity since the messages are described elsewhere herein. At step 1, a service request arrives at the CSE. A "CSF Dispatcher 902" may be used to represent an entity that processes the requests and identifies that the request is targeting a service that involves multiple steps of operations. Refer to Table 2 for more descriptions of service based operations. At step 2, the CSF Dispatcher 902 distributes the requests to relevant CSFs. Note that some operations may depend on the response to other requests, but this is not shown in the figure for clarity.

At step 3, some of the operations to fulfill the service may be completed. Note that some operations may depend on a credit check being executed. At step 4, the SD-CTF 534 at the CSFs 542 may trigger either charging events for Offline charging or a charging request for Online charging. A service request may involve both Online Charging and Offline Charging. At steps 5, 6, and 7, the SD-CM 524 at the end node 527 may dispatch the service requests for Online charging and charging reports for Offline charging to the respective SD-OCS 512 and SD-OFCS 514 at the infrastructure node 506. It may also aggregate requests and responses. Some of the procedures may be dependent on others. At step 8, other operations completed. The CSF Dispatcher 902 may receive a status. It may also notify the service requestor of the completion of the service.

Table 3 below lists messages that may be used in the service domain charging operations. Key information elements (IEs) are listed to indicate the use of these messages, and other IEs may be included to convey additional information. These messages may be supported by different styles protocols, such as RESTful protocols or based protocols, or other protocols based thereon. A service layer charging system as set forth herein may apply a RESTful architecture or a non-RESTful architecture.

TABLE 3

Exemplary Service Domain Charging Operations Messages

| Message Name | Descriptions | Key IEs | Reference Point | Related Resources and Operations |
|---|---|---|---|---|
| Charging Config Req/Rsp | The pair of messages used for pushing, soliciting and negotiating charging policies (such as supported charging types, rate, etc). The issuer may send the charging policies to the receiver, or it may request charging policy input from the receiver. | The charging policy or a pointer to the charging policy, such as an URL of where it is stored; Unique IDs to identify what the policy applies for, such as a subscriber, an application, a service, a session, etc. | X, Y, Z, E | For the setting of charging configuration and policies, it is achieved by operations (such as CREATE, RETRIEVE, UPDATE, DELETE) of the chargingConfigs collection, <chargingConfig> resource or any of the child resource of <chargingConfig>. For the setting of specific charging rules, it is achieved by operations on the chargingRules collection, or <chargingRule> for a specific rule, |

TABLE 3-continued

Exemplary Service Domain Charging Operations Messages

| Message Name | Descriptions | Key IEs | Reference Point | Related Resources and Operations |
| --- | --- | --- | --- | --- |
| Charging Report Req/Rsp | The pair of messages used for two charging functions to exchange charging information, including service domain offline charging to report charging events; SD-OCS at the end node or intermediate node to report online charging events to SD-OCS at the infrastructure node | Charging event with its associated parameters; unique IDs of the involved entities. | Y, Z, E | or an attribute of a <chargingRule> resource. charging Records are used for the report. |
| Credit Check Req/Rsp | The pair of messages used for credit checking, requesting and granting. | Credit unit; number of credits; unique IDs of the involved entities | Y, E | Credit check can be achieved by operating the <chargingCredit> resource. |
| Credit Reservation Req/Rsp | The pair of messages used for a requestor to reserve credits from the charging system | Credit unit; number of credits; unique IDs of the involved entities | Y, E | Credit reservation can be achieved by operating the <chargingCredit> resource. |
| Billing Req/Rsp | The pair of messages used for the SD-CS to exchange billing information with the service billing domain | SD-CDR files; SD-CDRs | E | charging Records are used for the report. |

In an embodiment, data structures may be used to support the charging mechanisms disclosed herein. Such data structures may take the form of resources. A resource may be a uniquely addressable object in the RESTful architecture. A resource may have a representation that can be transferred and manipulated with the RESTful verbs (e.g., CREATE, RETRIEVE, UPDATE, DELETE). A resource may be addressed uniquely using a Universal Resource Identifier (URI). A child resource may be a resource that has a containment relationship with an addressed (i.e., parent) resource. The parent resource representation may contain one or more references to sub-resources(s) (i.e., child resources). The lifetime of a child-resource may be limited by the parent's resource lifetime. An attribute may store information, such as meta-data about the resource itself.

Resource-based data structure may make it easier to perform RESTful operations, such as using protocols such as Hypertext Transfer Protocol (HTTP) or Constrained Application Protocol (CoAP). However, such a data structure may also be applied to non-RESTful protocols. A resource may contain child resource(s) and attribute(s).

The defined structure enables flexible and extensible service layer charging mechanisms. The originator may set up charging policies and configurations to the receiver using the chargeConfig resource. Additionally, the originator may set up different charging rules based on the charging configuration and policies. These rules may indicate who (the entity that charges) will charge whom (the entity being charged) based on what (e.g., online or offline charging, event based, service based, or session based charging, etc.). The charging rule enables the system to have different granularities. For example, the charging rule may be based on a logical function, such as a CSE node or an application. The charging rule may also or instead, be based on a resource. For example, the charging rule may be based on an entity that wants to charge every reading operation of a specific resource. Though not shown in the figures, all the resources should support vendor specific attributes/child resources.

As used in the figures, the following shapes illustrate an exemplary, non-limiting resource structure:

Square boxes are used for resources and child resources

Square boxes with round corners are used for attribute

Parallelograms are used for collection of resources

In Read/Write access mode, the following values may be assumed:

Read/Write (RW) may be set by a CREATE or an UPDATE operation

Figure 10:
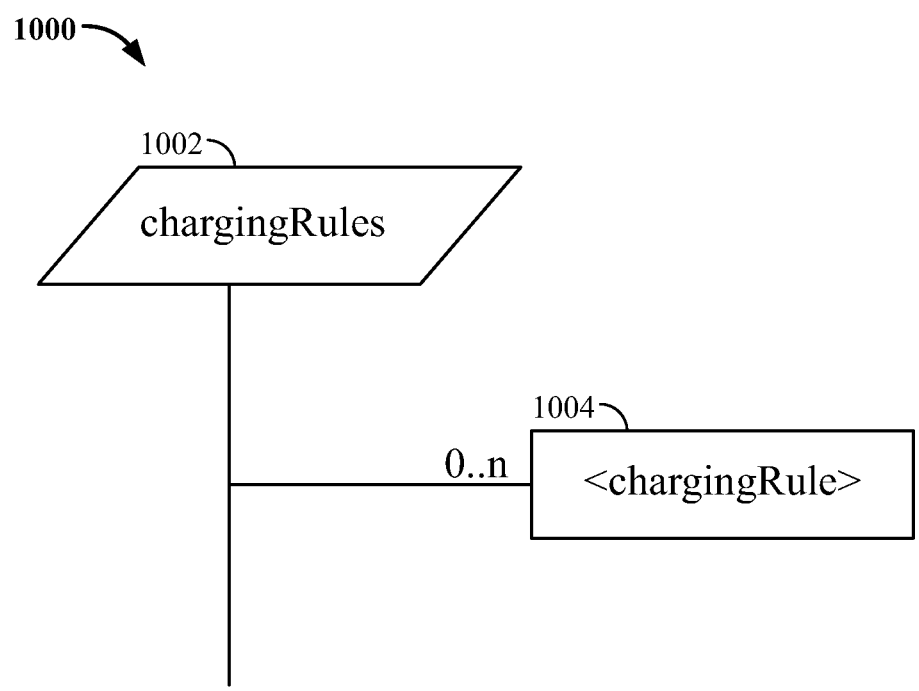
FIG. 10 is a diagram that shows an exemplary non-limiting collection of charging rules.

Read Only (RO) may be set by the CSE when the resource is Created and/or Updated; such an attribute may only be read Write Once (WO) may be set by the requestor (i.e., the entity that initiated the request) at a Create operation; such an attribute may thereafter only be read FIG. 10 is a diagram that shows exemplary non-limiting collection 1000 of charging rules 1002 (i.e., charging policies). An application, such as the SD-CM at a CSE, or another policy server (for example, a third party policy server) may send Charging Config messages to create and update charging rules. A collection may have from zero to multiple individual charging rules, indicated as <chargingRule> 1004. Note that "ID" as used herein may refer to a unique identifier or may be a URI pointing to a location of a referred resource. By referring to IDs, different resources may be effectively associated.

resource, it may either include an entity ID to associate to an entity, or its parent resource needs to have an entity ID.

Table 4 below lists exemplary attributes that may be used for defining a charging rule. Note that the "ID" listed here may be a unique ID, such as a numeric ID, or a uniquely addressable URI that points to the associated resource.

TABLE 4

Exemplary Attributes for Defining a Charging Rule

| Attribute/child resource | Description |
|---|---|
| ruleID 1106 | This is the unique ID of the charging rule. It is created by the CSE when the charging rule resource is first created. |
| originatorID 1108 | This is the unique ID of the entity that charges another entity. For example, it may be an application ID or an CSE ID. |
| originatorType 1118 | This is the type of the originator, such as "application", "CSE". |
| creatorID 1110 | This is the unique ID of the entity that created the charging rule. For example, it may be an application ID or an CSE ID. In common cases, the "creator" and the "originator" of the charging rule can be the same entity. |
| creatorType 1112 | This is the type of the creator, such as "application", "CSE". |
| receiverID 1116 | This is the unique ID of the entity that being charged. For example, it can be an application ID or an CSE ID, or a resource ID. |
| receiverType 1118 | This is the type of the receiver, such as "application", "CSE". |
| ruleStatus 1120 | This attribute indicates whether the rule is "active" or "inactive", or "information recording only" which means no charging is performed. |
| chargingType 1122 | This attribute indicates whether the charging rule applies for ONLINE or OFFLINE charging. |
| chargingModel 1124 | This attribute indicates the charging model, such as "session based charging", "event based charging", "service based charging", "session based charging", etc. |
| sessionID 1126 | This attribute indicates the unique service session ID, if the chargingType is "session based charging". It is mandatory of the chargingModel is session based charging. |
| serviceID 1128 | This attribute indicates the unique ID of the service being charged. A service provider can define its own services. It is mandatory if the charging model is service based charging. |
| chargeableEventID 1130 | This attribute refers to the resource that defines the chargeable event that should be applied to this charging rule. It is mandatory if the charging model is event based charging. |
| chargingRateID 1132 | This attributes refers to the charging rate resource. |
| chargingRecordFormID 1134 | This attribute refers to the ID of a specific type of a charging record. The format of this charging record should be used for this charging rule. It is mandatory of the charging type is offline charging or a combined charging type that requires charging records. |
| chargingCredit 1104 | This child resource defines the allowed credit for online charging. |

Figure 11:
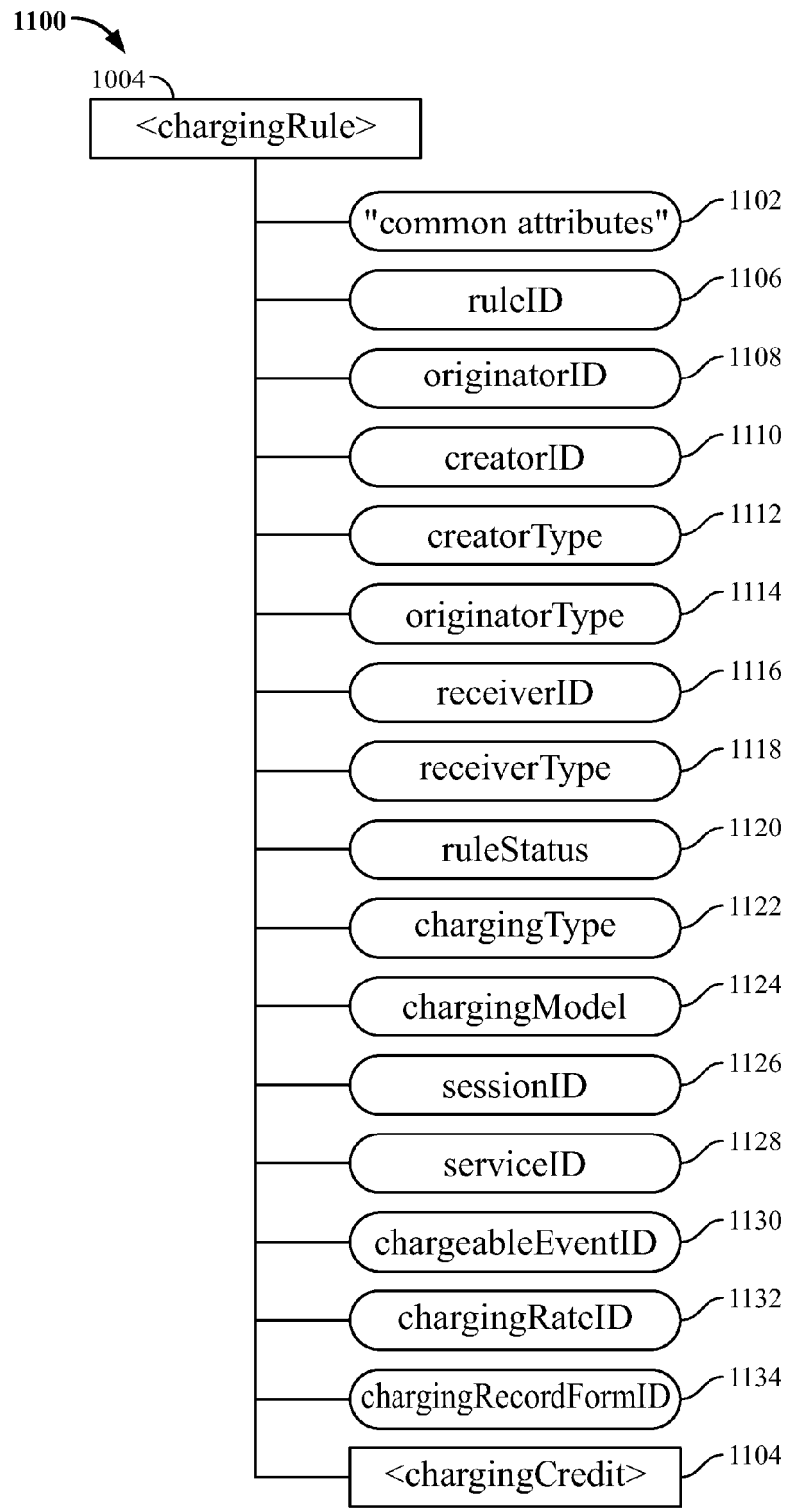
FIG. 11 is a diagram that illustrates an exemplary non-limiting resource structure for a <chargingRule> resource.
Figure 12:
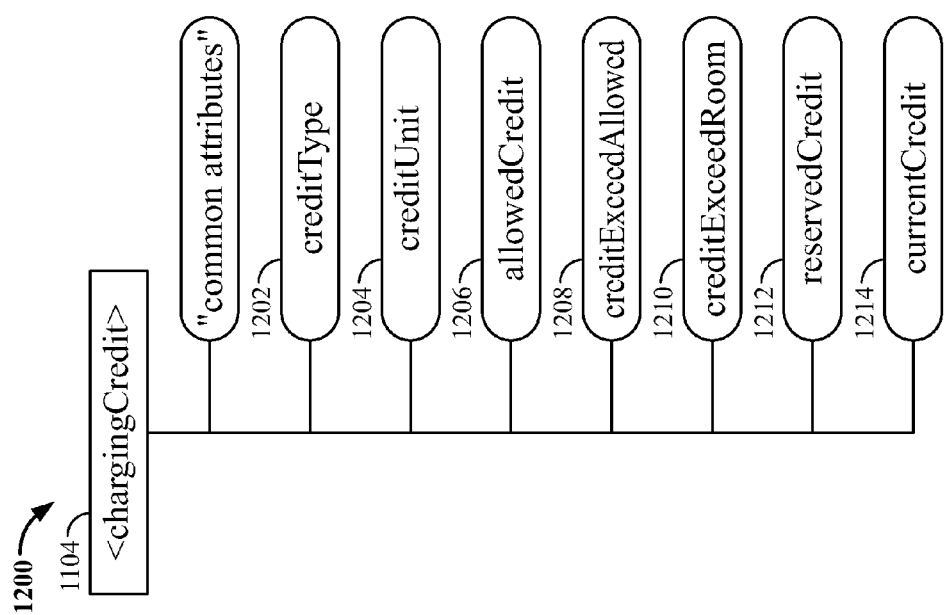
FIG. 12 is a diagram that illustrates an exemplary non-limiting resource structure for <chargingCredit>.

FIG. 11 is a diagram that illustrates exemplary non-limiting resource structure 1100 for a <chargingRule> resource. "Common attributes" 1102 refers to generic (i.e., non-charging specific) attributes such as the creation time of a resource and the expiration time of a resource. The common resources that are not specifically associated with charging, such as access right and subscriptions may also be included in "common attributes". Note that the <chargingCredit> 1104 may be associated with this the charging rule or it can be a separate resource. In an embodiment, it may be associated with the entity that has the credit. If it is associated with the charging rule, the <chargingCredit> 1104 may define the receiver's credit. If it is a separated FIG. 12 is a diagram that illustrates exemplary non-limiting resource structure 1200 for <chargingCredit> 1104. Table 5 below lists some exemplary attributes for <chargingCredit> 1104.

TABLE 5

Exemplary Attributes for Charging Credit

| Attribute/child resource | Description |
|---|---|
| creditType 1202 | This is the type of the credit, such as a type of currency, data storage. |
| creditUnit 1204 | This is the unit of the credit, for example, unit of a type of currency, or unit of data storage size. |

TABLE 5-continued

Exemplary Attributes for Charging Credit

| Attribute/child resource | Description |
|---|---|
| allowedCredit 1206 | This is the allowed credit for the entity. |
| creditExceedAllowed 1208 | This defines whether exceeding credit is allowed or not. |
| creditExceedRoom 1210 | If exceeding credit limit is allowed, this attribute defines the allowed room. |
| reservedCredit 1212 | This attribute shows the reserved credit. |
| currentCredit 1214 | This attribute shows the current available credit. |

Figure 13:
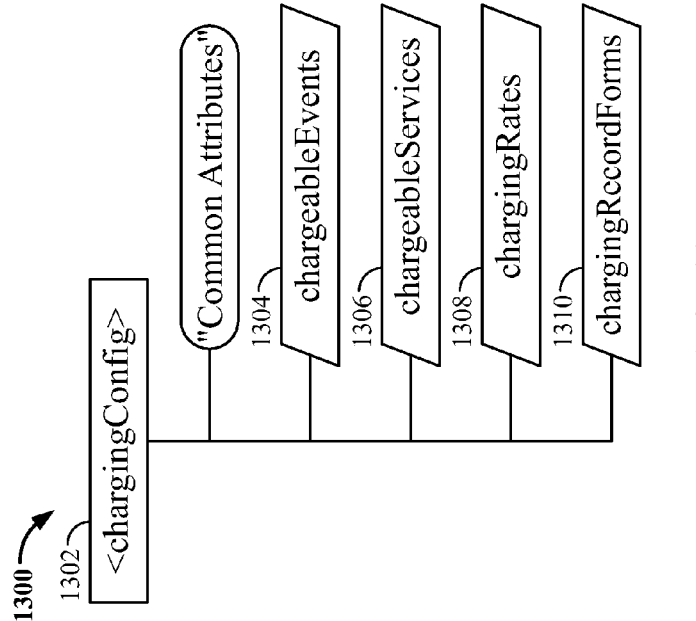
FIG. 13 is a diagram that illustrates an exemplary non-limiting resource structure for a charging configuration.

FIG. 13 is a diagram that illustrates an exemplary non-limiting resource structure 1300 for a charging configuration. Stored using this structure may be charging configurations and policies, such as chargeable events, chargeable services, rate, and charging record forms. There may also be a collection for the <chargingConfig> resource 1302 that can be called chargingConfigs. This collection may be made up of <chargingConfig> resources 1302. Table 6 below lists some exemplary attributes (child resources) for charging-Configs.

TABLE 6

Definition of Child Resources for Charging Configuration

| Child Resource Name | Description |
|---|---|
| chargeableEvents 1304 | This is a collection of chargeable events. It is mandatory when the charging model is event based. The graphical illustration is the same as FIG. 10 for chargingRules and it is not shown. Same for other collections. |
| chargeableServices 1306 | This is a collection of chargeable services. It is mandatory when the charging model is service based. |
| chargingRates 1308 | This is a collection of charging rates. |
| serviceProcedures 1310 | This is the collection of charging record form. It is mandatory when the charging type is offline charging, or it is a combined charging type which requires charging records. |

Figures 14, 15:
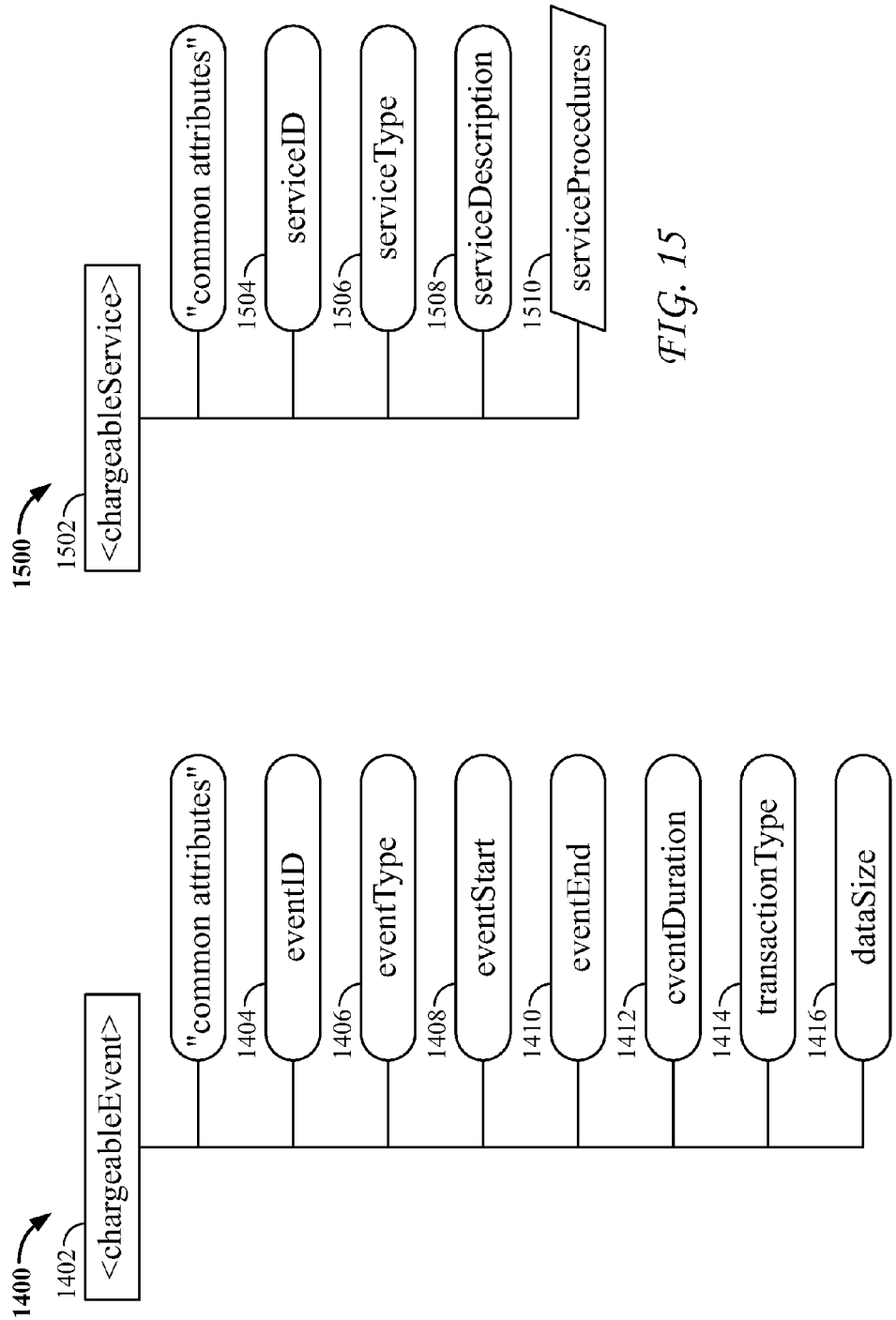
FIG. 14 is a diagram that illustrates an exemplary non-limiting resource structure for a <chargeableEvent>.
FIG. 15 is a diagram that illustrates an exemplary non-limiting resource structure for a <chargeableService>.

FIG. 14 is a diagram that illustrates an exemplary non-limiting resource structure 1400 for a <chargeableEvent> 1402. Table 7 below lists some exemplary attributes for a <chargeableEvent>.

TABLE 7

Exemplary Attributes for Chargeable Events

| AttributeName | Description |
|---|---|
| eventID 1404 | This uniquely identifies the chargeable event. |
| eventType 1406 | This attribute indicates the type of the event, such as meter reading. Timer based, storage based charging. |
| eventStart 1408 | This attribute indicates the start time of the event. |
| eventEnd 1410 | This attribute indicates the end time of the event. |
| eventDuration 1412 | This attribute indicates the duration of the event.. If a duration is provided, the both the start time and the end time are not required. |
| transactionType 1414 | This attribute defines the type of the chargeable operation, such as CREATE, RETRIEVE. |
| dataSize 1416 | This attribute defines the data size if an event is triggered when the stored data exceeded a certain size. |

One embodiment can be considered as a multi-step process. Step 1 can be the configuration of what service layer charging types are supported as shown in FIG. 13, such as event based, service based, subscription based. one M2M currently only supports event based charging.

Step 2 can be to configure the policy for the chargeable events. Each chargeable event has one instance of the data structure shown in FIG. 14. For example, in step 2, an entity can define a chargeable event based on "transactionType" as "RETRIEVAL". For each RETRIEVAL operation, it should trigger a chargeable event, e.g. eventID=001. The entity can also define another chargeable event based on both the transactionType and time period. For example it can define "transactionType=RETRIEVAL and eventStart=12 pm and eventEnd=20 pm, eventID=002. So for event 002, the chargeable event only happens when both conditions are met, i.e. the chargeable events only happen for the RETRIEVAL operation between 10 pm and 20 pm. Note that in this data structure, we do not specify who is charging whom (this is done in Step 3). We only define the policies, so these policies can be used to define many different scenarios in Step 3.

Step 3 can define the specific scenarios based on the chargeable event defined in step 2 using the data structure shown in FIG. 11. Here it defines who is charging whom. For example, for event 001 defined in step 2, an entity can define two scenarios, one for CSE1 charging AE1, using event 001, and one is for AE1 charging AE2 using event 001. Then for event 002, it can have a set of specific scenarios, for example, CSE1 charging AE1 using event 001, AE2 charging AE1 using event 002. In a deployment there can be many of these scenarios defined based on the policies set in step 2.

FIG. 15 is a diagram that illustrates an exemplary non-limiting resource structure 1500 for a <chargeableService> 1502. Table 8 below lists some exemplary attributes for a <chargeableService>.

TABLE 8

Exemplary Attributes for Chargeable Services

| AttributeName | Description |
|---|---|
| serviceID 1504 | This is a unique ID to identify this service. It may be the same ID used in the <chargingRule> resource. |
| Serviceype 1506 | This defines the service type. The service types may be defined by the service provider. |
| ServiceDescription 1508 | This is the text to describe the service. |
| serviceProcedures 1510 | Defines a collection of operations and CSFs involved in order to provide certain services. |

Figure 16:
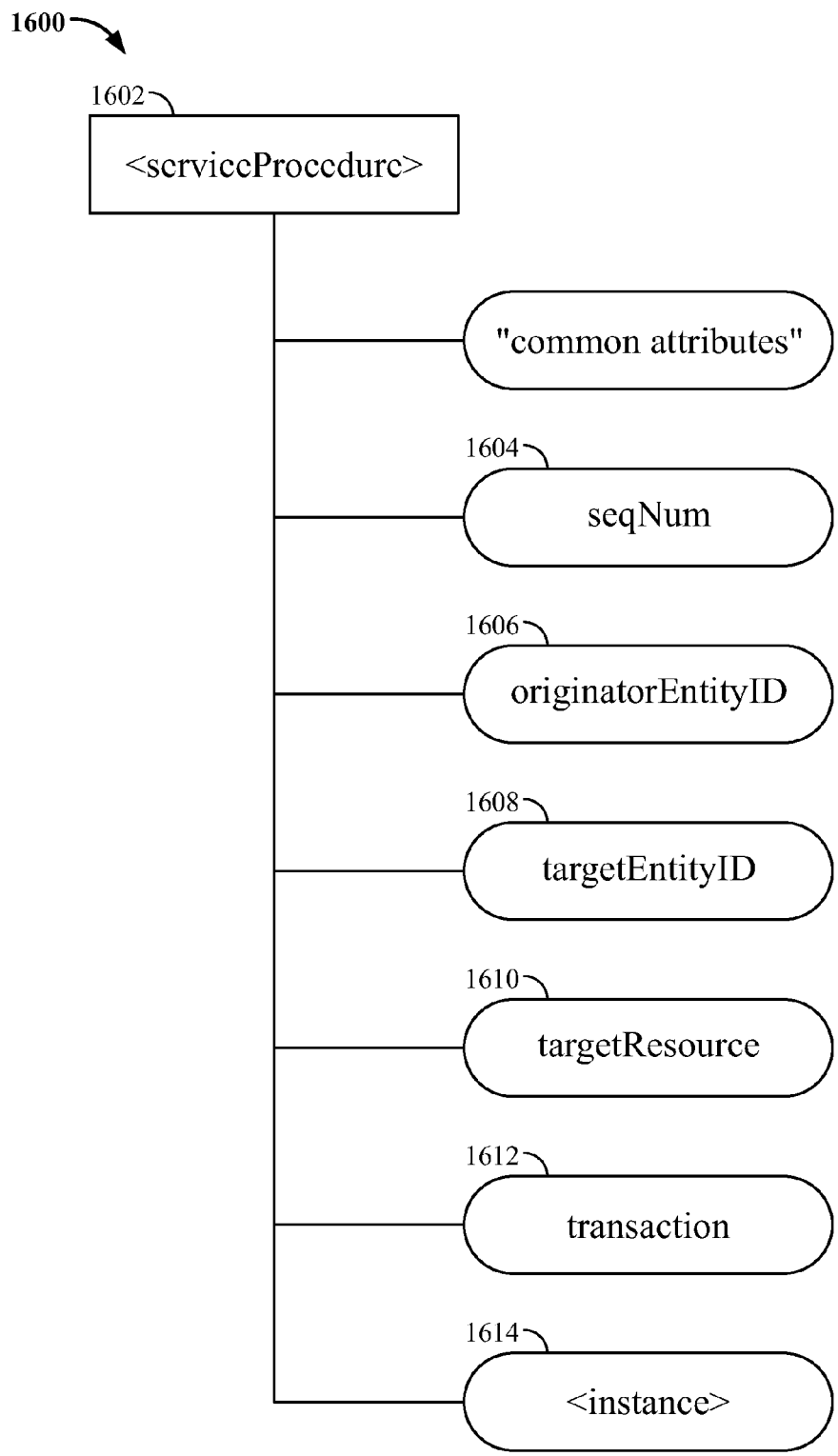
FIG. 16 is a diagram that illustrates an exemplary non-limiting resource structure for a <serviceProcedure>.

FIG. 16 is a diagram that illustrates an exemplary non-limiting resource structure 1600 for a <serviceProcedure> 1602. In an embodiment, a <serviceProcedure> resource 1602 may specify the actions needed to fulfill a service. Note that a service request originator may not be able to define the service procedures. The service procedures may be defined by the CSE, which may determine the entities that are to be involved in providing the service. Table 9 below lists some exemplary attributes for a <serviceProcedure> 1602.

TABLE 9

Exemplary Attributes for Service Procedures

| AttributeName | Description |
|---|---|
| seqNum 1609 | This is the execution sequence if, for one <chargeableService>, there are more than one <serviceProcedure>. |
| originatorEntityID 1606 | This indicates the unique ID of the originator of the transaction, such as an CSE ID or an application ID. |

TABLE 9-continued

Exemplary Attributes for Service Procedures

| AttributeName | Description |
|---|---|
| targetEntityID 1608 | This indicates the unique ID of the targeted entity by the transaction. |
| targetResource 1610 | This is the URI of the targeted resource for this operation. |
| Transaction 1612 <instance> | This defines the operation to be performed. The operation may involve creation/update of existing resources so the request will include the data representation. |

A chargingRate collection resource may define the rate to be charged for a chargeable event or service. The service provider may choose to post the rate to the service entities. The chargingRate resource may associate a specific chargeable event, a subscriber, a service, etc. with the rate. The rate may be specific to other factors, such as a specific time. The rate may be dynamically increased or decreased based on the previous transactions.

ChargingRecords may be created based on the defined <chargingRecordForm>. Each <chargingRecordForm> may define a specific charging record format. ChargingRecords may be the instances created.

Figure 17:
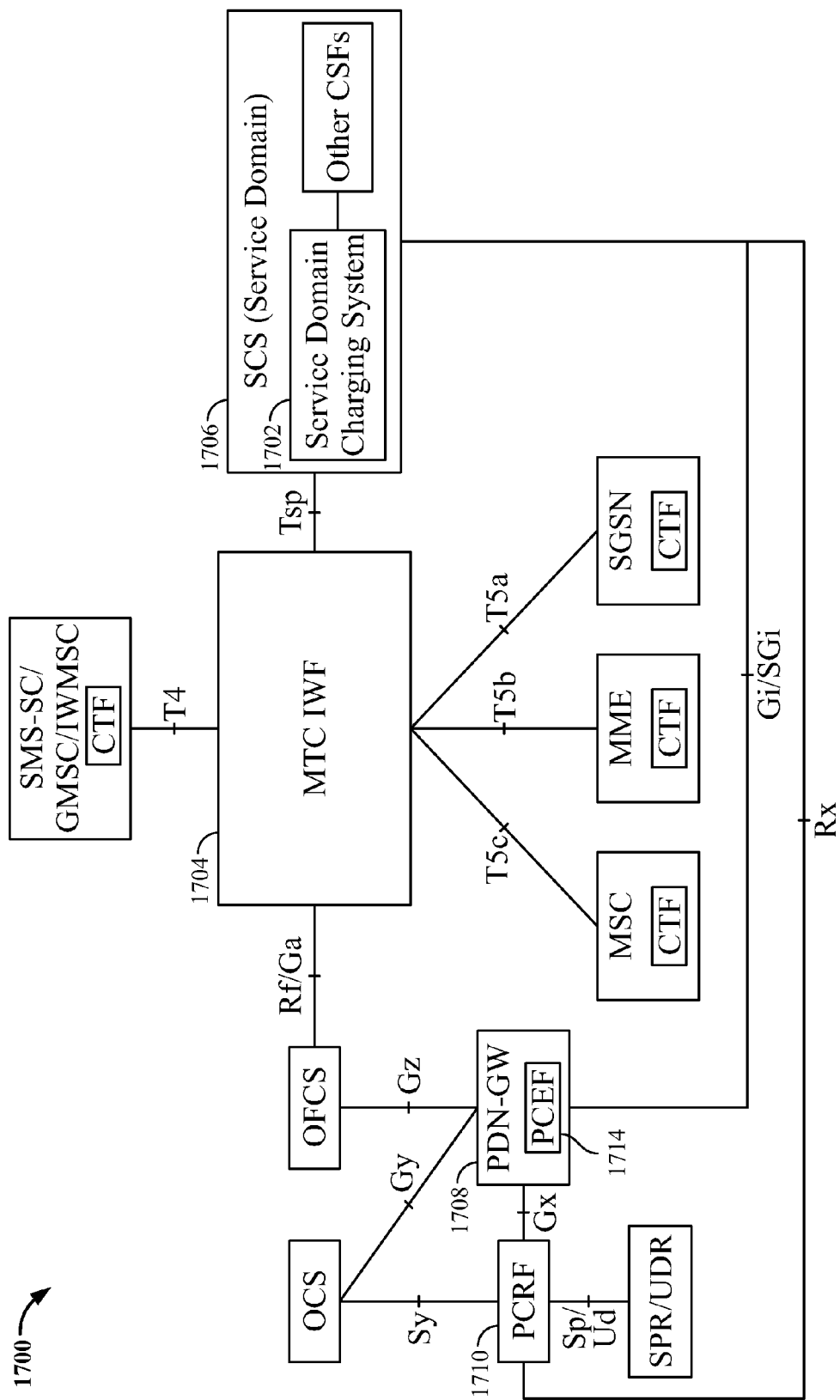
FIG. 17 is a diagram that illustrates a service domain charging system (SD-CS) that may interface, with an underlying 3GPP network via the Z reference point.

FIG. 17 is a diagram that illustrates a service domain charging system (SD-CS) 1702 that interface, with an underlying 3GPP network via the Z reference point. The anchor point in SD-CS 1702 for Z reference point is the SD-CM function. In terms of charging related operations, the Z reference point may be realized in different ways, including via the Tsp, Gi/SGi and Rx reference points as shown in exemplary, non-limiting architecture 1700 of FIG. 17. Tsp is the control plane interface between the SCS 1706 (service domain) and the MTC-IWF 1704. Gi/SGi is the user plane interface between the SCS 1706 and the PGW 1708. Rx is the interface between the Application Function (AF) and PCRF 1710. 3GPP specifies that the AF may be a third party application server.

In more de-coupled embodiments, the service domain and 3GPP domain may exchange CDRs, integrate the CDRs, and regenerate converged billing information. In more integrated embodiments, the service domain and the 3GPP domain may exchange charging policy information and conduct charging in one domain. Below are listed some of the scenarios involving SD-CS 1702 interworking with the 3GPP charging and billing system:
1. 3GPP charging only: SD-CTF collects SD chargeable events and passes the events to the 3GPP charging system.
2. 3GPP assisted charging: SD-CTF collects SD chargeable events; SD-OFCS generates CDRs and passes the CDRs to the 3GPP charging system. The 3GPP charging system consolidates the SD-CDRs into the 3GPP CDRs.
3. 3GPP assisted billing: SD-CTF collects SD chargeable events; SD-OFCS generates CDRs and creates CDR files. SD-CDR files are transferred from the SD-CS function to the 3GPP MTC-IWF 1704 via the Tsp reference point. The 3GPP charging system consolidates the SD-CDR files and the 3GPP CDR files and passes them to the 3GPP billing domain.
4. SD independent billing: The SD uses its independent billing system to process the SD-CDR files. The SD billing system may exchange information with the 3GPP billing domain.
5. SD only billing: The SD gets charging information from the 3GPP charging system and generates converged billing for both the 3GPP domain and service domain.

The presently disclosed embodiments are related to the service domain and impact to the 3GPP domain is described only as necessary. Note that some operations disclosed herein may be performed on more than one reference point. An exemplary list of messages and their applicability to different reference points is provided above in Table 3.

Some embodiments utilize the Tsp interface. In such embodiments, the service domain and the 3GPP domain may exchange charging information. The charging information may be carried in the form of CDRs or CDR files over the Tsp reference point defined in 3GPP. Such scenarios may include:
1. MTC-IWF 1704 pulls service domain charging information from SD-CS 1702
2. MTC-IWF 1704 pushes 3GPP domain charging information to SD-CS 1702
3. SD-CS 1702 pulls 3GPP domain charging information from MTC-IWF 1704
4. SD-CS 1702 pushes service domain charging information to MTC-IWF 1704

When an exchange is initiated by SCS 1706, if it is a push, the SD-CS 1702 may include the SD-CDR files in the payload of the CDR Transfer Req message. The 3GPP MTC-IWF 1704 may simply respond to the request or it may also include 3GPP CDR files in the response message. Similar operations may be used in the other direction when 3GPP initiated the exchange. The service domain and 3GPP domain may also exchange charging related policies via Tsp.

Some embodiments utilize the Rx interface. In such embodiments, the Rx reference point may be used for the service domain and the 3GPP domain to exchange charging related policies. The SCS 1706 may subscribe to notifications about 3GPP traffic events. For example, the SCS 1706 may receive a notification that an IP session has been closed or a UE has handed over to a different access technology, and the CSE at the SCS 1706 may take actions to trigger service domain operations. The service domain and the 3GPP domain may exchange session related information over Rx for session based charging.

Some embodiments utilize the Gi/SGi interface. In such embodiments, because the service domain operations are user plane traffic in 3GPP, the service domain may include service domain charging information together with the service domain operations (such as data creation, retrieval) and send the information to the 3GPP domain via Gi/SGi. The Policy and Charging Enforcement Function (PCEF) 1714 may process the information and perform charging at 3GPP.

Figure 18A:
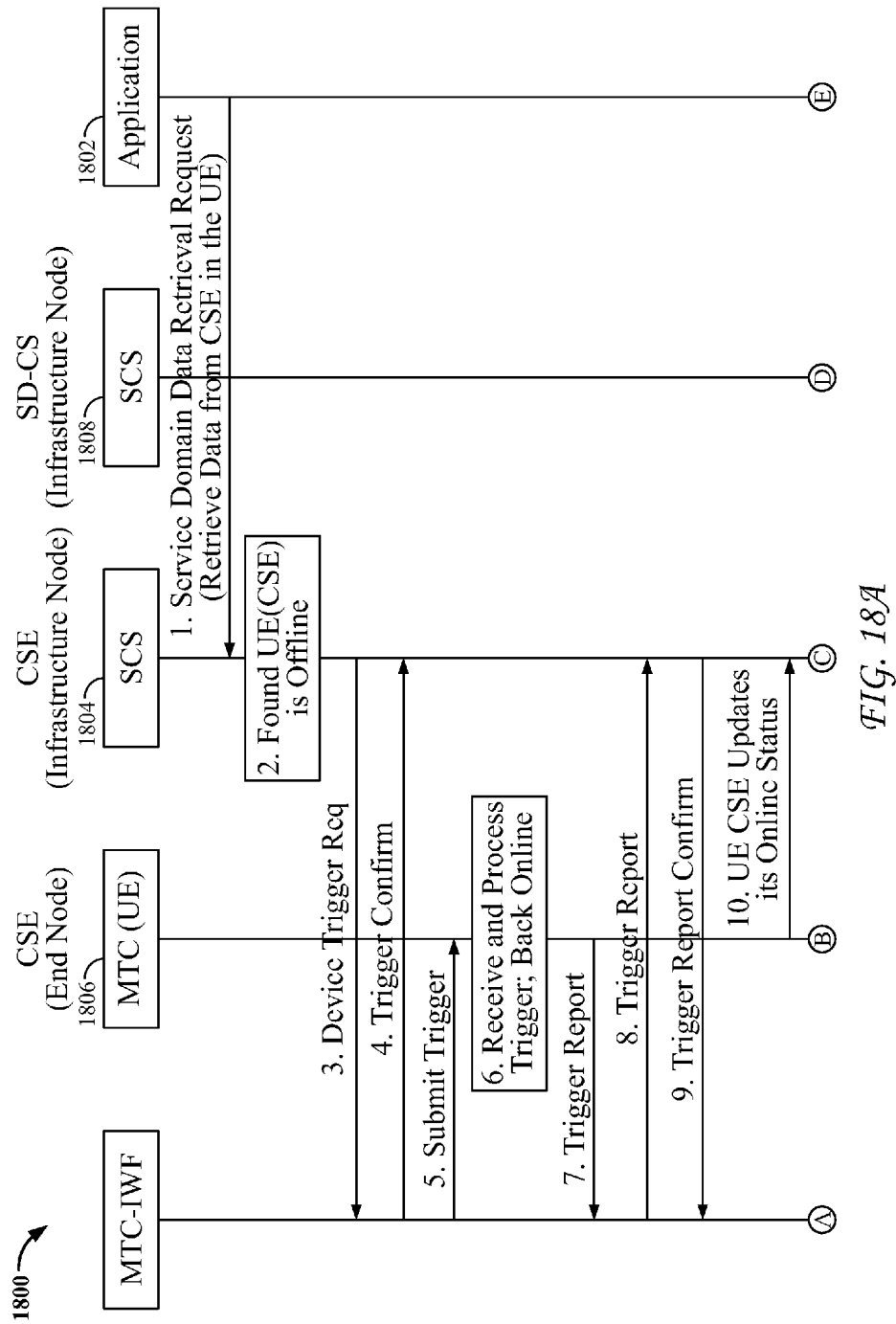
FIGS. 18A and 18B are a flow chart that illustrates a call flow for service domain interworking with 3GPP on charging related operations for the device triggering procedure
Figure 18B:
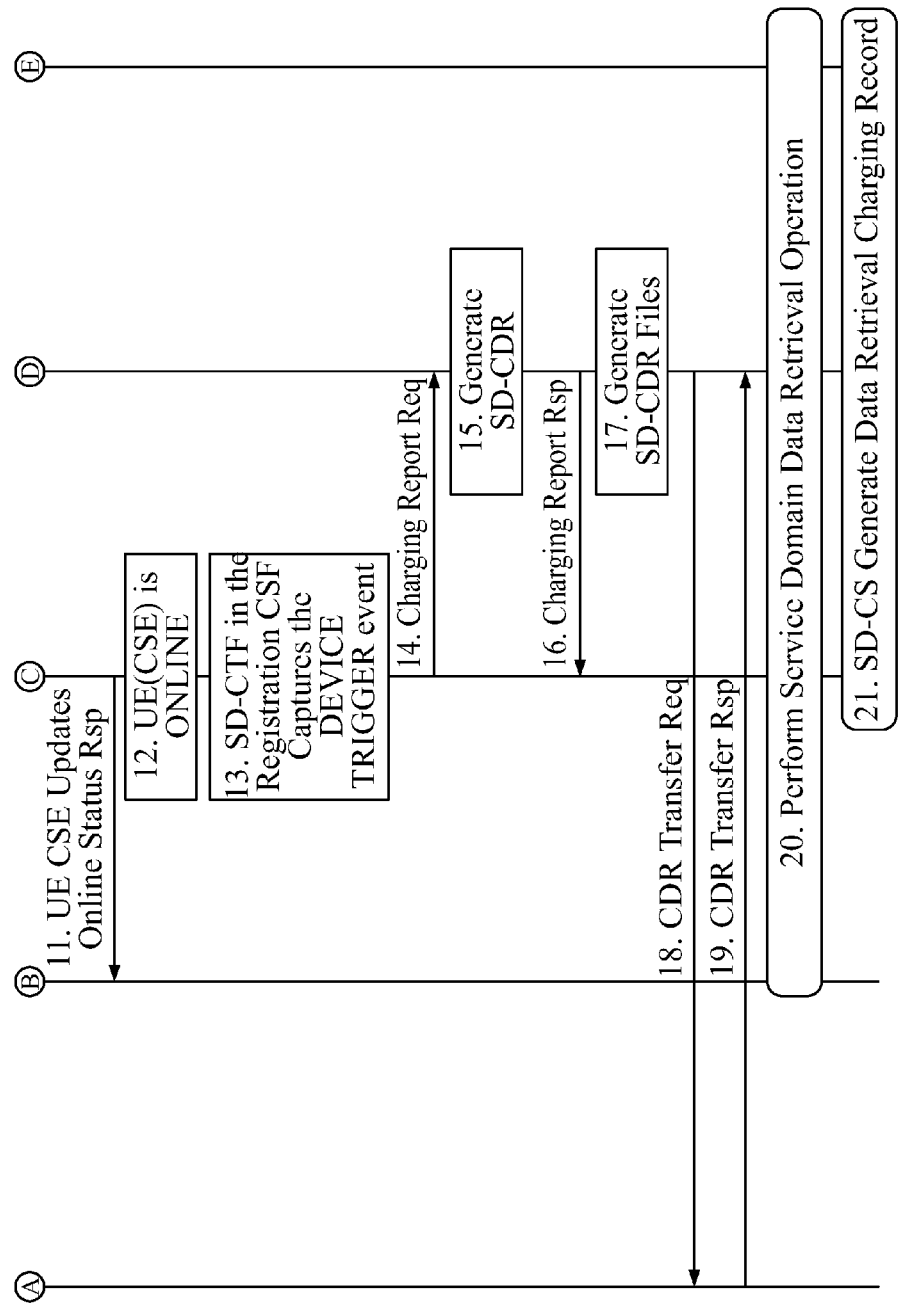

FIGS. 18A and 18B are a flow chart that illustrates an exemplary signal flow 1800 showing a scenario for SCS initiated device triggering. In such embodiments, that service domain may be interworking with 3GPP on charging related operations. The lines in bold in FIG. 18 indicate operations and messages in 3GPP. At step 1, a network application 1802 may send a request to retrieve data from a MTC device. At step 2, upon receiving the request, the CSE in the infrastructure node (known as SCS 1804 in 3GPP) checks whether the CSE in an end node (MTC) 1806, is registered, and its online status. In the illustrated signal flow, the MTC 1806 is offline. The SCS determines to trigger the device. Steps 3-9 describe the 3GPP procedure to trigger the MTC device 1806. At steps 10-12, the MTC device 1806 is online and the status is updated at the infrastructure node. At steps 13-17, the SD-CTF captures the charging event and sends the Charging Report message to the SD-CS 1808. Since the SD-CS 1808 receives the charging event from all CSFs, it may integrate these SD-CDRs and generate the SD-CDR file. The 3GPP and service domain need to correlate the IMSI and the service domain ID (such as subscription ID) to associate the CDRs in both domains for the same MTC device 1806. At steps 18-19, the service domain and 3GPP domain may exchange CDRs or CDR files over the Tsp reference point. At steps 20-21, at any point when the MTC 1806 is back online, the data retrieval request from the network application may be performed and a service domain specific SD-CDR may be generated for this operation. This CDR may or may not be exchanged with the 3GPP charging system.

Figure 19A:
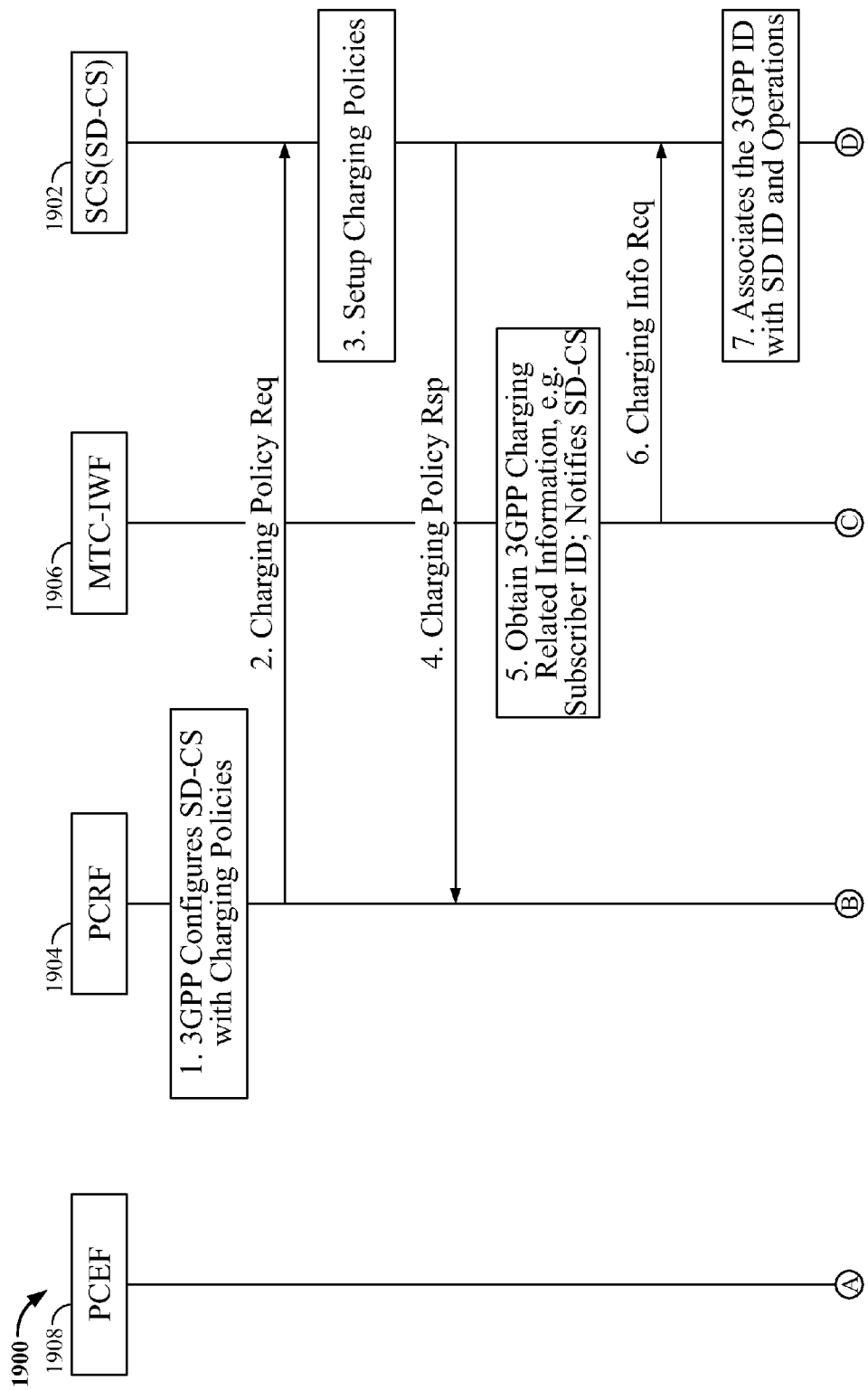
FIGS. 19A and 19B are a flow chart that illustrates an exemplary signal flow showing the interactions between SD-CS and the 3GPP charging system.
Figure 19B:
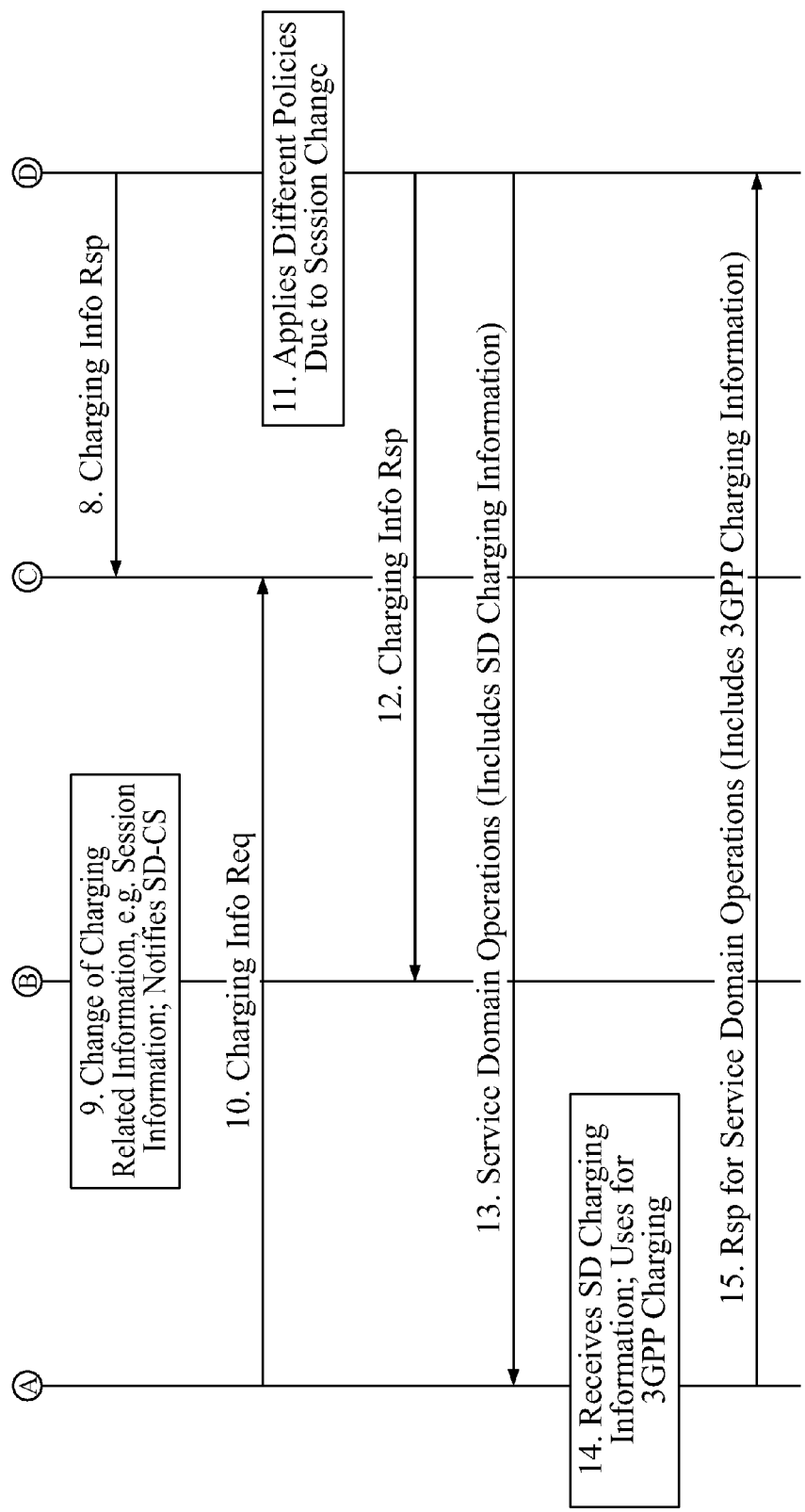

FIGS. 19A and 19B are a flow chart that illustrates an exemplary signal flow 1900 showing the interactions between SD-CS 1902 and the 3GPP charging system. The procedures shown in this figure, and the procedures shown in any figure described herein, do not have to happen in the sequence shown in the respective figure. Such interactions may provide more integrated charging between 3GPP and the service domain.

At steps 1-4, in an embodiment, the 3GPP charging system may be in control of SD-CS 1902. The 3GPP charging policy entity PCRF 1904 may send a charging policy configuration for SD-CS 1902 via the Rx reference point. The SD-CS 1902 may configure its charging policy based on input from the 3GPP charging system. At steps 5-8, the MTC-IWF 1906 may send 3GPP charging information to the SD-CS 1902 via the Tsp reference point. For example, the MTC-IWF 1906 may have 3GPP subscriber information and the SD-CS 1902 may associate the 3GPP ID with the service domain IDs. At steps 9-12, the PCRF 1904 may pass 3GPP charging related information to SD-CS 1902, such as session status. The SD-CS 1902 may take actions according to its policies. For example, SD-CS 1902 may apply a different rate when a 3GPP session has been handed over to another access technology. At steps 13-15, in some embodiments, the SD-CS 1902 may attach service domain charging information in the service domain operation messages over the user plane reference point Gi/SGi to PCEF 1908. Charging may be performed at the PCEF 1908 and the information may be sent back to SD-CS 1902 over the user plane.

Table 10 below lists exemplary messages related to charging that may be exchanged between the 3GPP domain and the service domain.

TABLE 10

Exemplary Messages Exchanged between 3GPP Domain and Service Domain

| Message Name | Descriptions | Key IEs | Reference Point |
|---|---|---|---|
| CDR Transfer Req/Rsp | The pair of messages is used for exchanging SD-CDRs and 3GPP domain CDRs. CDRs can be in the form of single, group or CDR files. | IDs to identify both 3GPP and service domain entities and associate them together, such as SCS ID, IMSI, 3GPP session ID, SD session ID, SD subscriber ID, 3GPP service flow ID, etc. CDRs | Tsp |
| Charging Policy Req/Rsp | The pair of messages is used for the SD and 3GPP domain to exchange charging policies. One domain can take the dominant role to configure the charging policies of another domain. | IDs (as above) charging policies, such as charging types, rate, events, etc. | Rx, Tsp |
| Charging Info Req/Rsp | The pair of messages is used for the SD and 3GPP domain to exchange charging related information, such as IDs, session status, etc. | IDs (as above) transaction and traffic information that is related to charging | Rx, Tsp |
| Any service domain messages | Include service domain charging information in the service domain messages and send these messages over the user plane of 3GPP | service domain operations (e.g. data retrieval) service domain or 3GPP domain charging information (e.g. IDs, charging event, rate, etc.) | Gi/SGi |

Figure 20:
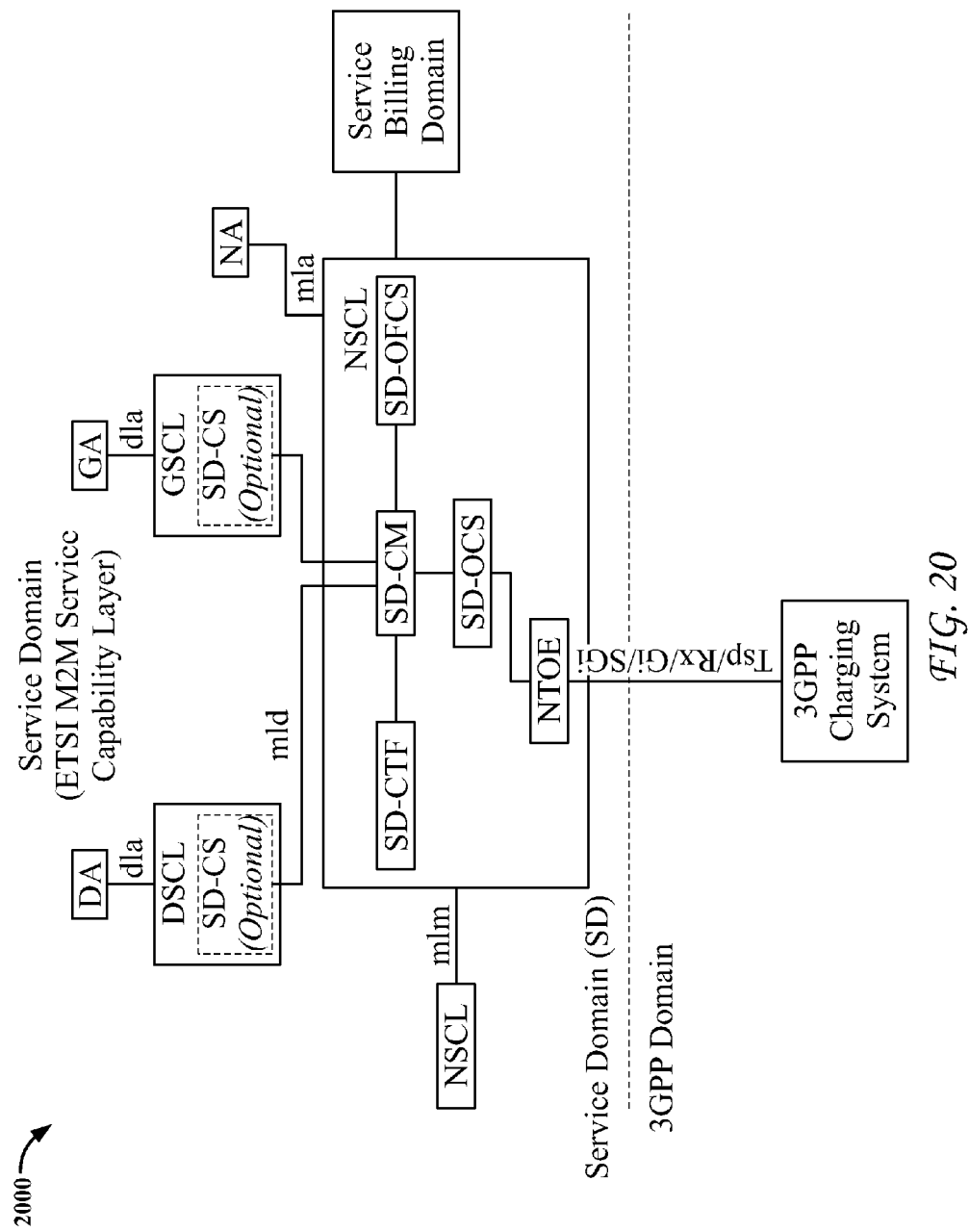
FIG. 20 is a diagram that illustrates an exemplary, non-limiting architecture where the SD-CS resides in the Compensation Brokerage (CB) service capability.
Figure 21:
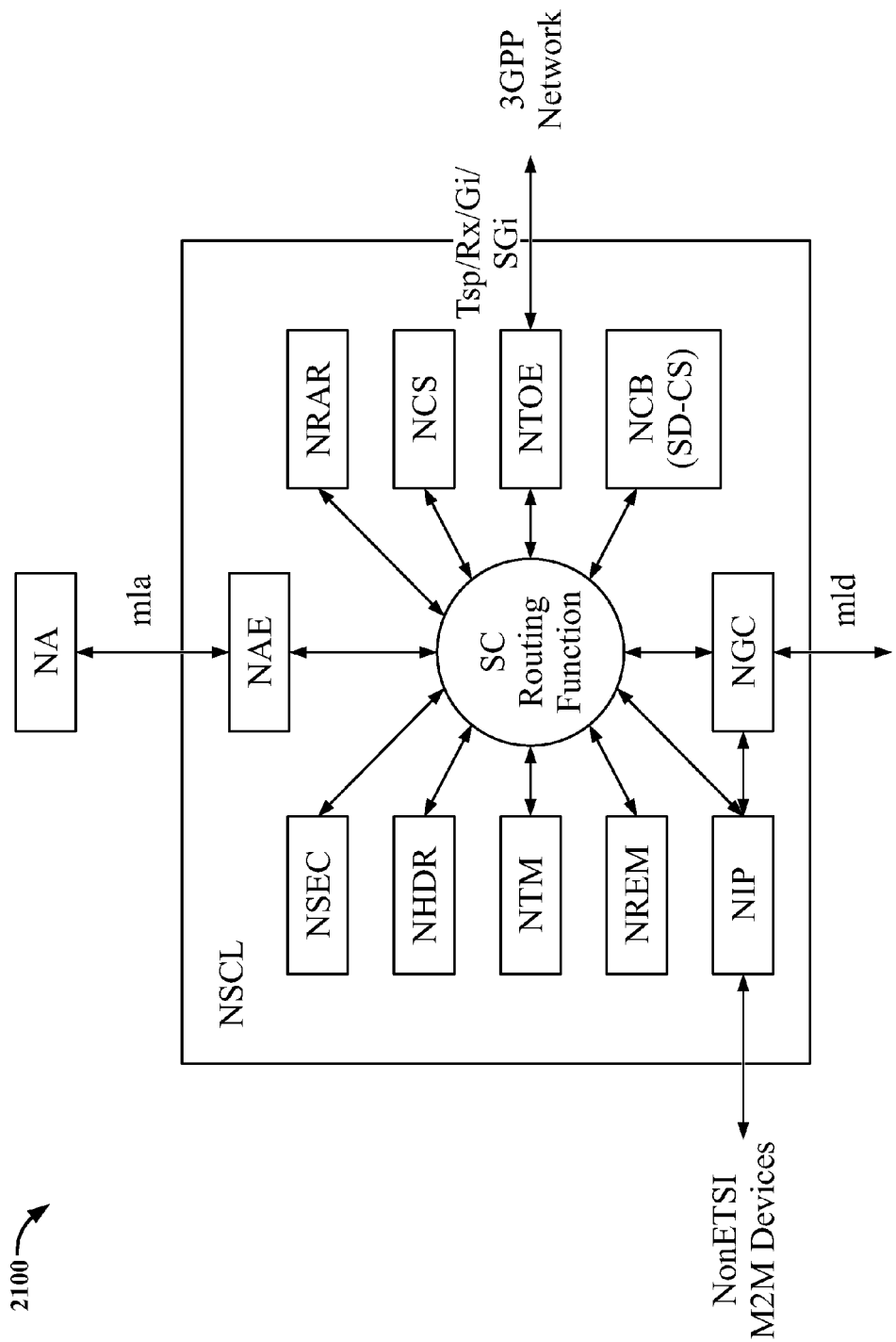
FIG. 21 illustrates an exemplary, non-limiting architecture according to an embodiment.

FIG. 20 is a diagram that illustrates an exemplary, non-limiting architecture 2000 where the SD-CS resides in the Compensation Brokerage (CB) service capability. The figure shows a network case. For devices and gateways the service capability layer may not contain a SD-CS or the service capability layer may contain a sub-set of SD-CS. The Gateway Compensation Brokerage (GCB) and Device Compensation Brokerage (DCB) may only contain SD-CTF, or SD-CTF and SD-CM. FIG. 21 illustrates exemplary, non-limiting architecture 2100 showing the SD-CS in different nodes.

Table 11 below lists exemplary non-limiting potential charging events that may be supported by an ETSI M2M charging system according to one embodiment.

TABLE 11

Exemplary ETSI M2M Charging Events

| Chargeable Entities/Events/Operations | | Description | Key IE |
|---|---|---|---|
| Subscription | | Charging is based on each M2M service layer subscription. | M2M Subscription Identifier (subscriber's profile, contract status, etc.) |
| ETSI M2M service connection | | Charge subscribers per ETSI secure service connection. One subscriber can have multiple service connections. | Service connection ID (duration of connection, Service class granted, etc.) |
| ETSI M2M SCL | | NSCL charges subscribers for each D/G SCL. When D/G SCL registers to NSCL, it triggers a charging event at NSCL | D/G SCL ID (duration of SCL, allocated space/memory, frequency of transactions, etc.) |
| ETSI M2M Application | | NA registers to NSCL; DA/GA registers to D/G SCL; DA/NA is charged for data storage services (e.g. number of containers, ..); DA/NA is charged for re-targeting services (number of requests SCL re-targets to an application); DA/NA is charged for resource discovery service on SCL; DA/NA is charged for SCL device management or announcement services. | Application ID (duration of Application, allocated space/memory, frequency of transactions, QoS granted, etc.) |
| ETSI M2M RESTful operations | | N (D/G) SCL logs the transactions and decides when to trigger a charging event based on its charging policy | Transaction ID (duration of Transaction, allocated space/memory, etc) |
| ETSI M2M CRUD operations | Reading a resource | NSCL charges NA for example for reading a sensed value. Different data might have different rates depending on NA | Resource ID, NA ID |
| | Creating a resource | NSCL charges NA for example for amount of storage NA needs | Resource ID, NA ID |
| | Updating a resource | NCSL charges NAfor updating already purchased storage | Resource ID, NA ID |
| | Deleting a resource | NSCL charges NA for deleting purchased storage | Resource ID, NA ID |

Figure 23A:
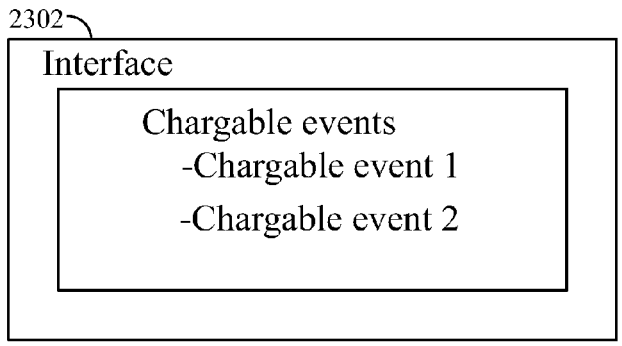
FIGS. 23A-23C are diagrams that illustrate exemplary interfaces that can be used with embodiments.
Figure 23B:
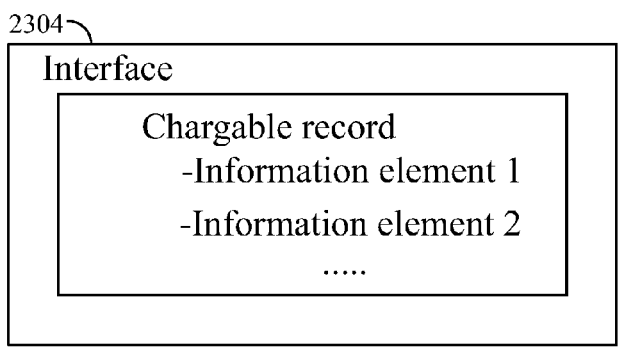
Figure 23C:
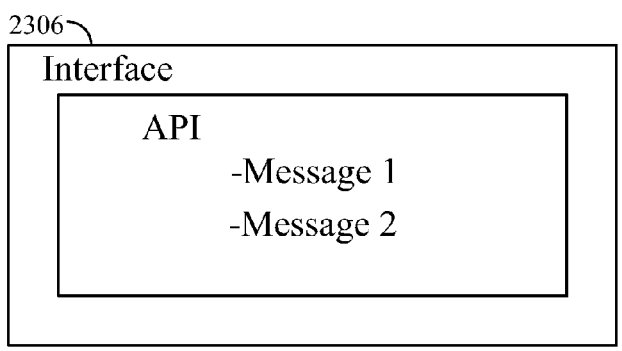

FIGS. 23A-23C are diagrams that show interfaces that can be used with embodiments of the service domain charging system and methods. The interfaces can be user interfaces, such as graphical user interfaces, that can be used to display and/or control the operation of embodiments of the service domain charging system and methods.

FIG. 23A is a diagram that shows an exemplary user interface 2302 of one embodiment that shows chargeable events, such as chargeable event 1 and chargeable event 2 that are associated with a device server or gateway.

FIG. 23B is a diagram that illustrates an exemplary user interface 2304 of one embodiment shows chargeable records and associated information elements.

FIG. 23C is a diagram that illustrates an exemplary user interface 2306 of one embodiment that shows API information, such as messages exchanged between nodes.

Interfaces, such as interfaces 2302, 2304 and 2306, can be used to view information related to the service domain charging system discussed above. Interfaces, such as interfaces 2302, 2304 and 2306, can also be used to configure and set data related to the service domain charging system discussed above. For example, such interfaces can be used to set charging related values for the system.

Figure 22A:
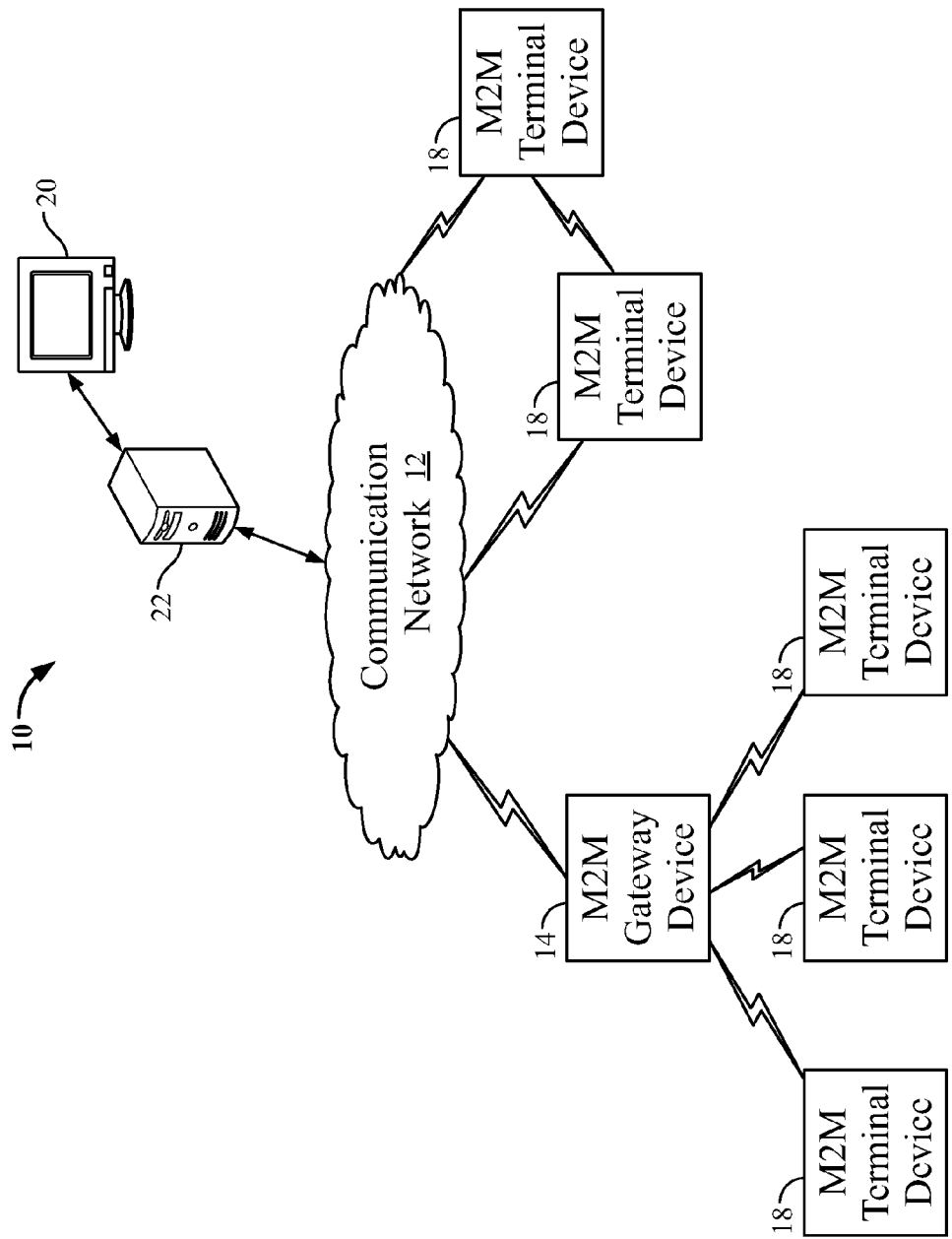
FIG. 22A is a system diagram of an example machine-to-machine (M2M) or Internet of Things (IoT) communication system in which one or more disclosed embodiments may be implemented.

FIG. 22A is a diagram of an example machine-to machine (M2M), Internet of Things (IoT), or Web of Things (WoT) communication system 10 in which one or more disclosed embodiments may be implemented. Generally, M2M technologies provide building blocks for the IoT/WoT, and any M2M device, gateway or service platform may be a component of the IoT/WoT as well as an IoT/WoT service layer, etc. Communication system 10 can be used to implement functionality of the disclosed embodiments and can include functionality and logical entities such as Service Domain Charging System, SD-CM 502, SD-OCS 512, SD-OFCS 514, SD-CTF 530, and logic to produce interfaces, such as interfaces 2302, 2304 and 2306

As shown in FIG. 22A, the M2M/IoT/WoT communication system 10 includes a communication network 12. The communication network 12 may be a fixed network (e.g., Ethernet, Fiber, ISDN, PLC, or the like) or a wireless network (e.g., WLAN, cellular, or the like) or a network of heterogeneous networks. For example, the communication network 12 may comprise of multiple access networks that provides content such as voice, data, video, messaging, broadcast, or the like to multiple users. For example, the communication network 12 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like. Further, the communication network 12 may comprise other networks such as a core network, the Internet, a sensor network, an industrial control network, a personal area network, a fused personal network, a satellite network, a home network, or an enterprise network for example.

As shown in FIG. 22A, the M2M/IoT/WoT communication system 10 may include the Infrastructure Domain and the Field Domain. The Infrastructure Domain refers to the network side of the end-to-end M2M deployment, and the Field Domain refers to the area networks, usually behind an M2M gateway. The Field Domain includes M2M gateways 14 and terminal devices 18. It will be appreciated that any number of M2M gateway devices 14 and M2M terminal devices 18 may be included in the M2M/IoT/WoT communication system 10 as desired. Each of the M2M gateway devices 14 and M2M terminal devices 18 are configured to transmit and receive signals via the communication network 12 or direct radio link. The M2M gateway device 14 allows wireless M2M devices (e.g. cellular and non-cellular) as well as fixed network M2M devices (e.g. PLC) to communicate either through operator networks, such as the communication network 12 or direct radio link. For example, the M2M devices 18 may collect data and send the data, via the communication network 12 or direct radio link, to an M2M application 20 or M2M devices 18. The M2M devices 18 may also receive data from the M2M application 20 or an M2M device 18. Further, data and signals may be sent to and received from the M2M application 20 via an M2M service layer 22, as described below. M2M devices 18 and gateways 14 may communicate via various networks including, cellular, WLAN, WPAN (e.g., Zigbee, 6LoWPAN, Bluetooth), direct radio link, and wireline for example.

Figure 22B:
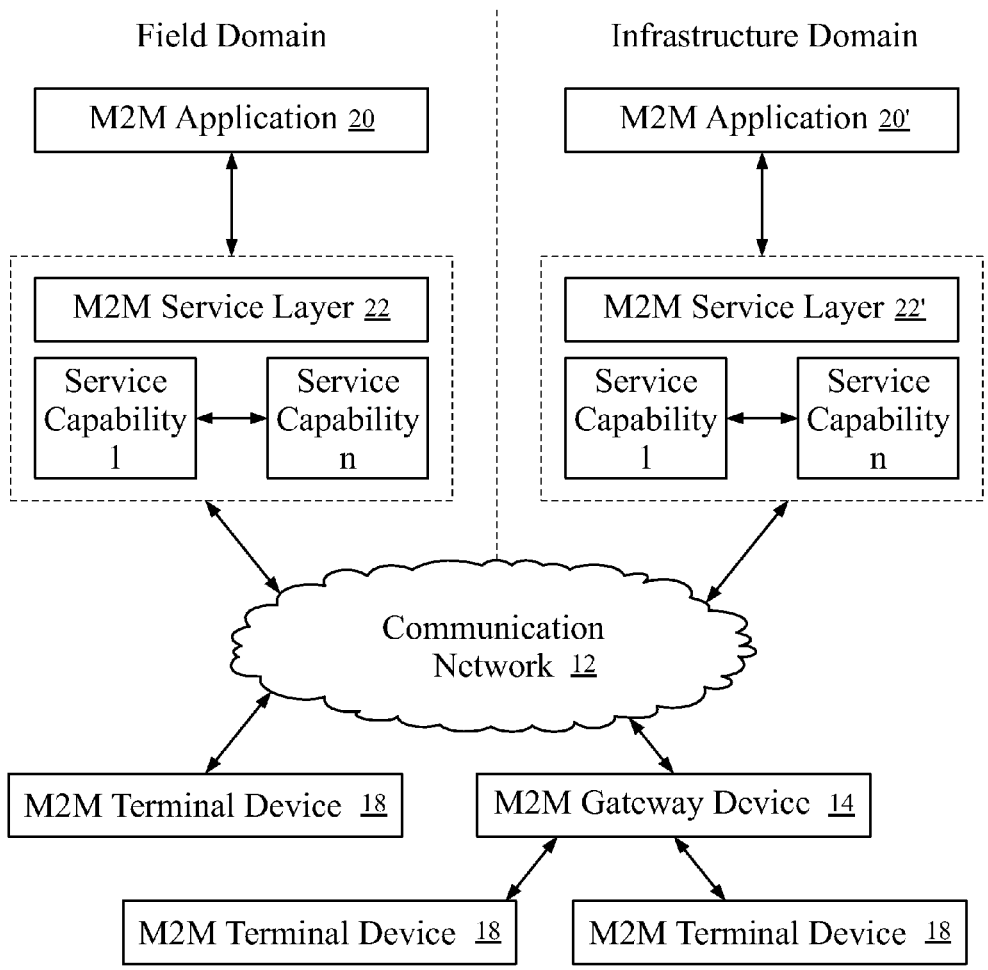
FIG. 22B is a system diagram of an example architecture that may be used within the M2M/IoT communications system illustrated in FIG. 22A.

Referring to FIG. 22B, the illustrated M2M service layer 22 in the field domain provides services for the M2M application 20, M2M gateway devices 14, and M2M terminal devices 18 and the communication network 12. Communication network 12 can be used to implement functionality of the disclosed embodiments and can include capillary device charging functionality and logical entities such as such as Service Domain Charging System, SD-CM 502, SD-OCS 512, SD-OFCS 514, SD-CTF 530, and logic to produce interfaces, such as interfaces 2302, 2304 and 2306. The M2M service layer 22 may be implemented by one or more servers, computers, devices, virtual machines (e.g. cloud/storage farms, etc.) or the like, including for example the devices illustrated in FIGS. 22C and 22D described below. It will be understood that the M2M service layer 22 may communicate with any number of M2M applications, M2M gateway devices 14, M2M terminal devices 18 and communication networks 12 as desired. The M2M service layer 22 may be implemented by one or more servers, computers, or the like. The M2M service layer 22 provides service capabilities that apply to M2M terminal devices 18, M2M gateway devices 14 and M2M applications 20. The functions of the M2M service layer 22 may be implemented in a variety of ways, for example as a web server, in the cellular core network, in the cloud, etc. Similar to the illustrated M2M service layer 22, there is the M2M service layer 22' in the Infrastructure Domain. M2M service layer 22' provides services for the M2M application 20' and the underlying communication network 12' in the infrastructure domain. M2M service layer 22' also provides services for the M2M gateway devices 14 and M2M terminal devices 18 in the field domain. It will be understood that the M2M service layer 22' may communicate with any number of M2M applications, M2M gateway devices and M2M terminal devices. The M2M service layer 22' may interact with a service layer by a different service provider. The M2M service layer 22' may be implemented by one or more servers, computers, virtual machines (e.g. cloud/compute/storage farms, etc.) or the like.

Referring also to FIG. 22B, the M2M service layer 22 and 22' provide a core set of service delivery capabilities that diverse applications and verticals can leverage. These service capabilities enable M2M applications 20 and 20' to interact with devices and perform functions such as data collection, data analysis, device management, security, billing, service/device discovery etc. Essentially, these service capabilities free the applications of the burden of implementing these functionalities, thus simplifying application development and reducing cost and time to market. The service layer 22 and 22' also enables M2M applications 20 and 20' to communicate through various networks 12 and 12' in connection with the services that the service layer 22 and 22' provide. The connection methods of the present application may be implemented as part of a service layer 22 and 22'. The service layer 22 and 22' is a software middleware layer that supports value-added service capabilities through a set of Application Programming Interfaces (APIs) and underlying networking interfaces. Both ETSI M2M and one M2M use a service layer that may contain the connection methods of the present application. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The one M2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). Further, connection methods of the present application can implemented as part of an M2M network that uses a Service Oriented Architecture (SOA) and/or a resource-oriented architecture (ROA) to access services such as the connection methods of the present application.

In some embodiments, M2M applications 20 and 20' may include the applications that interact with capillary devices and therefore may be used in conjunction with the disclosed systems and methods for capillary device charging. The M2M applications 20 and 20' may include the applications that interact with the UE or gateway and may also be used in conjunction with other disclosed charging systems and methods. The M2M applications 20 and 20' may include applications in various industries such as, without limitation, transportation, health and wellness, connected home, energy management, asset tracking, and security and surveillance. As mentioned above, the M2M service layer, running across the devices, gateways, and other servers of the system, supports functions such as, for example, data collection, device management, security, billing, location tracking/ geofencing, device/service discovery, and legacy systems integration, and provides these functions as services to the M2M applications 20 and 20'.

Generally, the service layers 22 and 22' define a software middleware layer that supports value-added service capabilities through a set of Application Programming Interfaces (APIs) and underlying networking interfaces. Both the ETSI M2M and one M2M architectures define a service layer. ETSI M2M's service layer is referred to as the Service Capability Layer (SCL). The SCL may be implemented within an M2M device (where it is referred to as a device SCL (DSCL)), a gateway (where it is referred to as a gateway SCL (GSCL)) and/or a network node (where it is referred to as a network SCL (NSCL)). The one M2M service layer supports a set of Common Service Functions (CSFs) (i.e. service capabilities). An instantiation of a set of one or more particular types of CSFs is referred to as a Common Services Entity (CSE) which can be hosted on different types of network nodes (e.g. infrastructure node, middle node, application-specific node). The Third Generation Partnership Project (3GPP) has also defined an architecture for machine-type communications (MTC). In that architecture, the service layer, and the service capabilities is provides, are implemented as part of a Service Capability Server (SCS). Whether embodied in a DSCL, GSCL, or NSCL of the ETSI M2M architecture, in a Service Capability Server (SCS) of the 3GPP MTC architecture, in a CSF or CSE of the one M2M architecture, or as some other component or module of a network, the service layer may be implemented as a logical entity (e.g., software, computer-executable instructions, and the like) executing either on one or more standalone servers, computers, or other computing devices or nodes in the network or as part of one or more existing servers, computers, or nodes of such network. As an example, a service layer or component thereof may be implemented in the form of software running on a server, computer, or device having the general architecture illustrated in FIG. 22C or FIG. 22D described below.

Further, the logical entities of the present application such as Service Domain Charging System, SD-CM 502, SD-OCS 512, SD-OFCS 514, SD-CTF 530, and logic to produce interfaces, such as interfaces 2302, 2304 and 2306 can implemented as part of an M2M network that uses a Service Oriented Architecture (SOA) and/or a resource-oriented architecture (ROA) to access services of the present application.

Figure 22C:
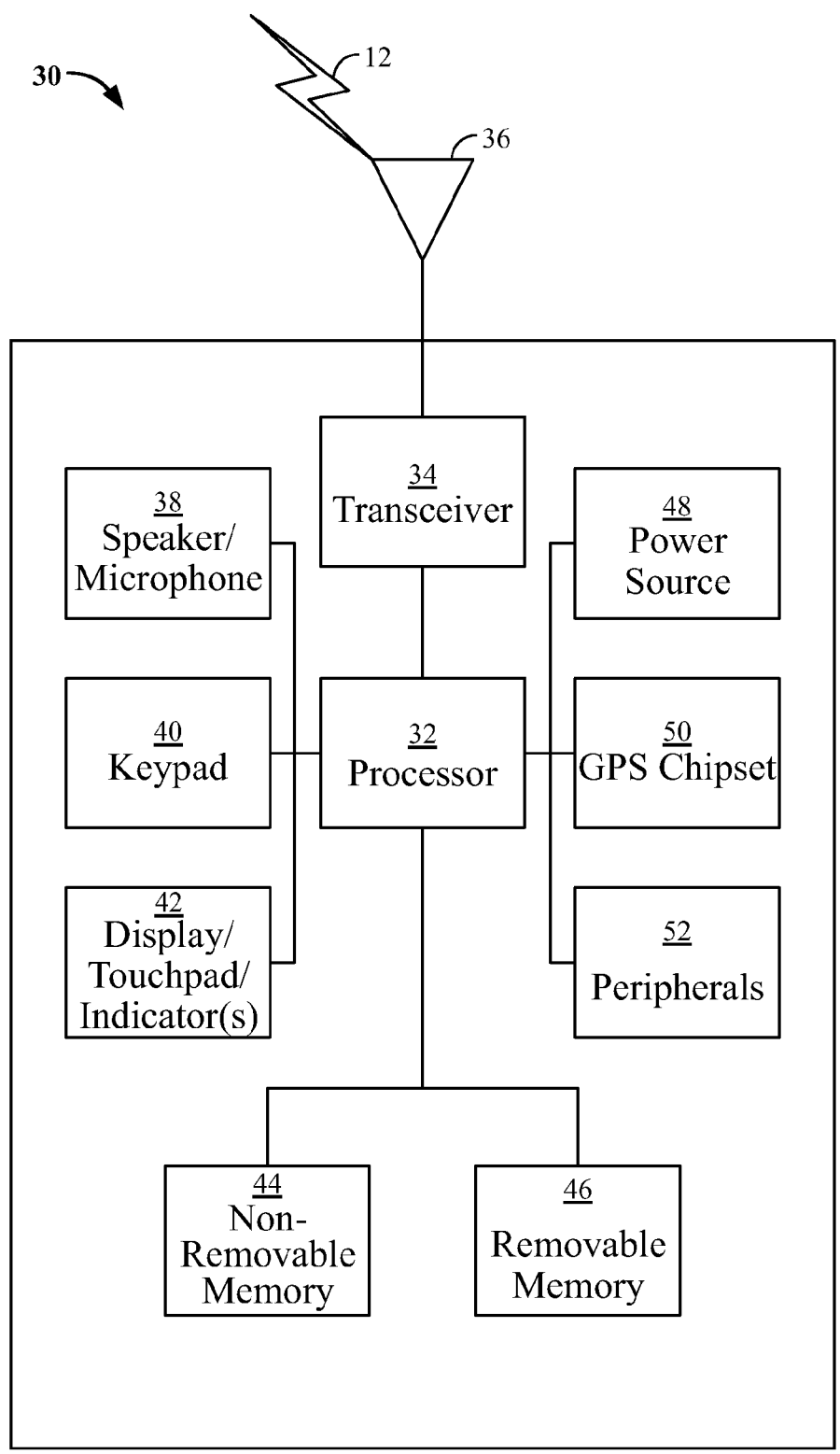
FIG. 22C is a system diagram of an example M2M/IoT terminal or gateway device that may be used within the communications system illustrated in FIG. 22A.

FIG.—C is a system diagram of an example device 30, that can be an M2M device, user equipment, gateway, UE/GW or any other nodes including nodes of the mobile care network, service layer network application provider, terminal device 18 or an M2M gateway device 14 for example. The device 30 can execute or include logical entities such as such as Service Domain Charging System, SD-CM 502, SD-OCS 512, SD-OFCS 514, SD-CTF 530, and logic to produce interfaces, such as interfaces 2302, 2304 and 2306. The device 30 can be part of an M2M network as shown in FIG. 22A-B or part of a non-M2M network. As shown in FIG. 22C, the device 30 may include a processor 32, a transceiver 34, a transmit/receive element 36, a speaker/microphone 38, a keypad 40, a display/ touchpad/indicator(s) 42, non-removable memory 44, removable memory 46, a power source 48, a global positioning system (GPS) chipset 50, and other peripherals 52. It will be appreciated that the device 30 may include any sub-combination of the foregoing elements while remaining consistent with an embodiment. This device may be a device that uses and/or implements the disclosed systems and methods for capillary device charging or other disclosed charging systems and methods.

The processor 32 may be a general purpose processor, a special purpose processor, a conventional processor, a digital signal processor (DSP), a plurality of microprocessors, one or more microprocessors in association with a DSP core, a controller, a microcontroller, one or more Application Specific Integrated Circuits (ASICs), one or more Field Programmable Gate Array (FPGAs) circuits, any other type and number of integrated circuits (ICs), a state machine, and the like. The processor 32 may perform signal coding, data processing, power control, input/output processing, and/or any other functionality that enables the device 30 to operate in a wireless environment. The processor 32 may be coupled to the transceiver 34, which may be coupled to the transmit/ receive element 36. While FIG. 22C depicts the processor 32 and the transceiver 34 as separate components, it will be appreciated that the processor 32 and the transceiver 34 may be integrated together in an electronic package or chip. The processor 32 may perform application-layer programs (e.g., browsers) and/or radio access-layer (RAN) programs and/or communications. The processor 32 may perform security operations such as authentication, security key agreement, and/or cryptographic operations, such as at the access-layer and/or application layer for example.

The transmit/receive element 36 may be configured to transmit signals to, and/or receive signals from, an M2M service platform 22. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/ detector configured to transmit and/or receive IR, UV, or visible light signals, for example. In yet another embodiment, the transmit/receive element 36 may be configured to transmit and receive both RF and light signals. It will be appreciated that the transmit/receive element 36 may be configured to transmit and/or receive any combination of wireless or wired signals.

In addition, although the transmit/receive element 36 is depicted in FIG. 22C as a single element, the device 30 may include any number of transmit/receive elements 36. More specifically, the device 30 may employ MIMO technology. Thus, in an embodiment, the device 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the device 30 may have multi-mode capabilities. Thus, the transceiver 34 may include multiple transceivers for enabling device 30 to communicate via multiple RATs, such as UTRA and IEEE 802.11, for example.

The processor 32 may access information from, and store data in, any type of suitable memory, such as the non-removable memory 44 and/or the removable memory 46. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the device 30, such as on a server or a home computer.

The processor 30 may receive power from the power source 48, and may be configured to distribute and/or control the power to the other components in the device 30. The power source 48 may be any suitable device for powering the device 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which may be configured to provide location information (e.g., longitude and latitude) regarding the current location of the device 30. It will be appreciated that the device 30 may acquire location information by way of any suitable location-determination method while remaining consistent with an embodiment.

The processor 32 may further be coupled to other peripherals 52, which may include one or more software and/or hardware modules that provide additional features, functionality and/or wired or wireless connectivity. For example, the peripherals 52 may include an accelerometer, an e-compass, a satellite transceiver, a sensor, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 22D:
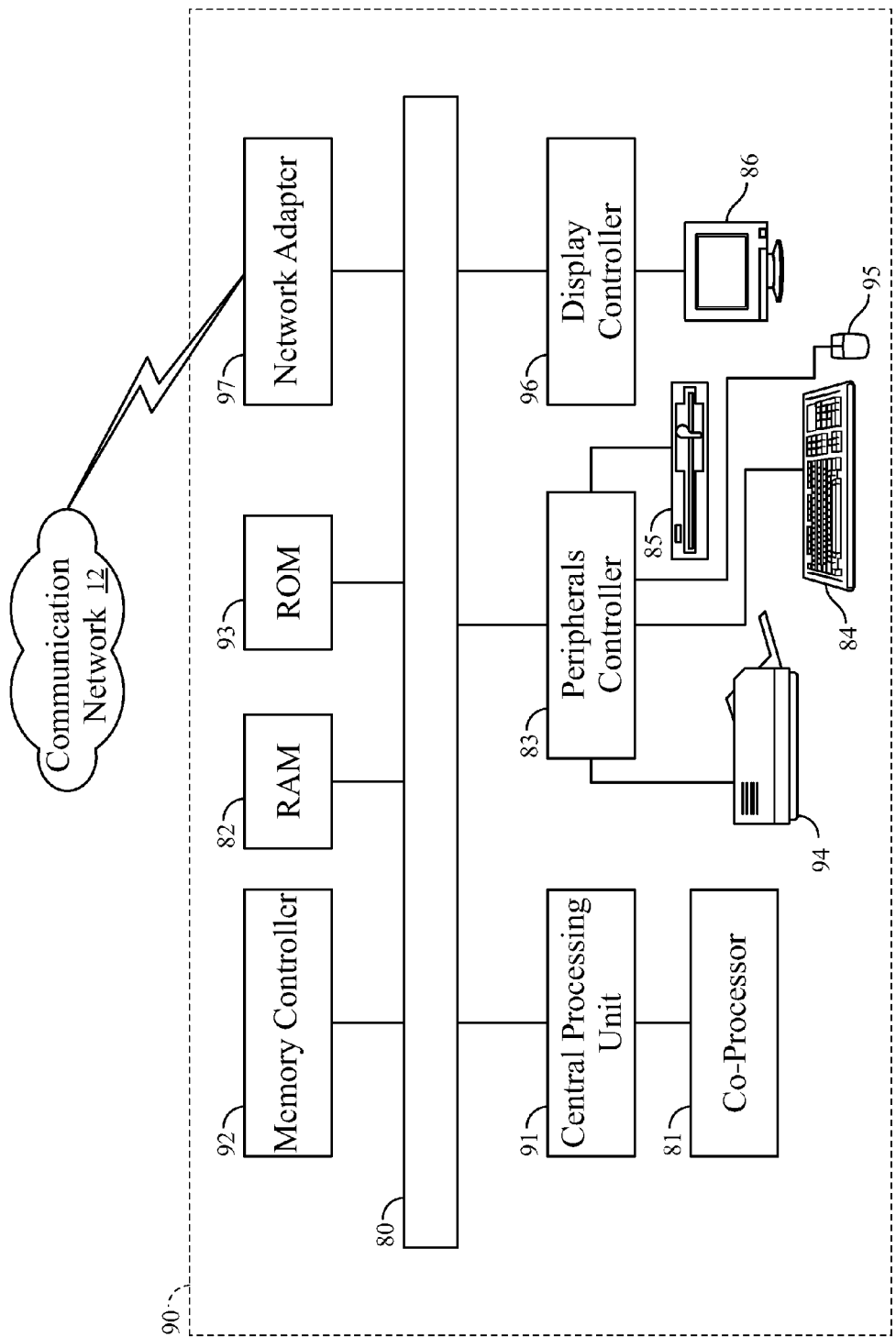
FIG. 22D is a block diagram of an example computing system in which aspects of the communication system of FIG. 22A may be embodied.

FIG. 22D is a block diagram of an exemplary computing system 90 on which, for example, the M2M service platform 22 of FIGS. 22A and 22B may be implemented. Computing system 90 may comprise a computer or server and may be controlled primarily by computer readable instructions, which may be in the form of software, wherever, or by whatever means such software is stored or accessed. Computing system 90 can execute or include logical entities such as Service Domain Charging System, SD-CM 502, SD-OCS 512, SD-OFCS 514, SD-CTF 530, and logic to produce interfaces, such as interfaces 2302, 2304 and 2306. Computing system 90 can be an M2M device, user equipment, gateway, UE/GW or any other nodes including nodes of the mobile care network, service layer network application provider, terminal device 18 or an M2M gateway device 14 for example. Such computer readable instructions may be executed within central processing unit (CPU) 91 to cause computing system 90 to do work. In many known workstations, servers, and personal computers, central processing unit 91 is implemented by a single-chip CPU called a microprocessor. In other machines, the central processing unit 91 may comprise multiple processors. Coprocessor 81 is an optional processor, distinct from main CPU 91 that performs additional functions or assists CPU 91. CPU 91 and/or coprocessor 81 may receive, generate, and process the data used in various embodiments of the disclosed systems and methods for capillary device charging or other disclosed charging systems and methods.

In operation, CPU 91 fetches, decodes, and executes instructions, and transfers information to and from other resources via the computer's main data-transfer path, system bus 80. Such a system bus connects the components in computing system 90 and defines the medium for data exchange. System bus 80 typically includes data lines for sending data, address lines for sending addresses, and control lines for sending interrupts and for operating the system bus. An example of such a system bus 80 is the PCI (Peripheral Component Interconnect) bus.

Memory devices coupled to system bus 80 include random access memory (RAM) 82 and read only memory (ROM) 93. Such memories include circuitry that allows information to be stored and retrieved. ROMs 93 generally contain stored data that cannot easily be modified. Data stored in RAM 82 may be read or changed by CPU 91 or other hardware devices. Access to RAM 82 and/or ROM 93 may be controlled by memory controller 92. Memory controller 92 may provide an address translation function that translates virtual addresses into physical addresses as instructions are executed. Memory controller 92 may also provide a memory protection function that isolates processes within the system and isolates system processes from user processes. Thus, a program running in a first mode can access only memory mapped by its own process virtual address space; it cannot access memory within another process's virtual address space unless memory sharing between the processes has been set up.

In addition, computing system 90 may contain peripherals controller 83 responsible for communicating instructions from CPU 91 to peripherals, such as printer 94, keyboard 84, mouse 95, and disk drive 85. Display 86, which is controlled by display controller 96, is used to display visual output generated by computing system 90. Such visual output may include text, graphics, animated graphics, and video. Display 86 may be implemented with a CRT-based video display, an LCD-based flat-panel display, gas plasma-based flat-panel display, or a touch-panel. Display controller 96 includes electronic components required to generate a video signal that is sent to display 86.

Further, computing system 90 may contain network adaptor 97 that may be used to connect computing system 90 to an external communications network, such as network 12 of FIGS. 22A and 22B. In an embodiment, network adaptor 97 may receive and transmit data used by various disclosed systems and methods for capillary device charging or other disclosed charging systems and methods.

It is understood that any or all of the systems, methods, and processes described herein may be embodied in the form of computer executable instructions (i.e., program code) stored on a computer-readable storage medium. Such instructions, when executed by a machine, such as a computer, server, M2M terminal device, M2M gateway device, or the like, perform and/or implement the systems, methods and processes described herein. Specifically, any of the steps, operations or functions described above, including the operations of the gateway, UE, UE/GW, or any of the nodes of the mobile core network, service layer or network application provider, may be implemented in the form of such computer executable instructions. Logical entities s such as Service Domain Charging System, SD-CM 502, SD-OCS 512, SD-OFCS 514, SD-CTF 530, and logic to produce interfaces, such as interfaces 2302, 2304 and 2306 may be embodied in the form of the computer executable instructions. Computer readable storage media include both volatile and nonvolatile, removable and non-removable media implemented in any method or technology for storage of information, but such computer readable storage media do not include signals. Computer readable storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other physical medium that can be used to store the desired information and that can be accessed by a computer.

In describing preferred embodiments of the subject matter of the present disclosure, as illustrated in the FIGS., specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. In a service layer of a communication network, a method comprising:
   configuring a charging policy at the service layer, the charging policy being defined as a rule with associated attributes that instructs the service layer how to create a charging data record (CDR) for a service that the service layer performs on behalf of a requestor, where the service includes a sequence of multiple operations performed by the service layer based on plural inputs received from the requestor,
   the attributes including a rule status attribute indicating if the rule is active, and a chargeable event identifier,
   the charging policy being stored in a resource configurable using Create, Retrieve, Update, Delete (CRUD) operations;
   using the charging policy to determine chargeable events within the service layer of the communication network;
   triggering an online or offline charging event based on the determined chargeable events;
   wherein the charging policy includes a configuration with attributes including eventID, event type, event start, event end, and data size and
   wherein the configuration is used to create a charging event.

2. The method of claim 1 wherein the charging policy is received from an application.

3. The method of claim 1, wherein the chargeable event identifier identifies a chargeable event object with additional attributes defining an event in the service layer of the communication network.

4. The method of claim 1, wherein the attributes include an originator identifier identifying the charging party, and a receiver ID indicating the charged party.

5. The method of claim 1, wherein the resource is addressable with a uniform resource indicator (URI).

6. The method of claim 1, wherein the charging policy defines service based charging.

7. The method of claim 1, wherein the service domain charging management function offers configurable charging services to applications.

8. The method of claim 1, wherein the configuration is used to perform a credit check and make a determination about providing a service.

9. The method of claim 1, wherein the charging policy concerns online charging.

10. The method of claim 1, wherein the charging policy includes an eventID attribute that identifies the event.

11. The method of claim 1, wherein the charging policy includes an eventType attribute that indicates the type of the event.

12. The method of claim 11, wherein the charging policy includes an operationType attribute that defines the type of the operation to be collected.

13. The method of claim 1, wherein the charging policy includes a chargingCredit attribute defines the avowed credit for online charging, and the charging policy includes a chargingType attribute that indicates whether the charging rule applies for ONLINE or OFFLINE charging.

14. The method of claim 1, wherein the charging policy is configured at the service domain charging management function at the service layer.

15. The method of claim 1, wherein the configuring and using steps are performed at the infrastructure node.

16. The method of claim 1, wherein the multiple operations depend on an outcome of a preceding operation.

17. The method of claim 1, wherein the online charging event produces one or more of a credit check, credit reservation and record update.

18. The method of claim 1, wherein the offline charging event produces a charging record.

* * * * *